US007103806B1

(12) United States Patent  (10) Patent No.: US 7,103,806 B1
Horvitz  (45) Date of Patent: Sep. 5, 2006

(54) SYSTEM FOR PERFORMING CONTEXT-SENSITIVE DECISIONS ABOUT IDEAL COMMUNICATION MODALITIES CONSIDERING INFORMATION ABOUT CHANNEL RELIABILITY

(75) Inventor: Eric J. Horvitz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 676 days.

(21) Appl. No.: 10/281,547

(22) Filed: Oct. 28, 2002

Related U.S. Application Data

(63) Continuation-in-part of application No. 09/809,142, filed on Mar. 15, 2001, and a continuation-in-part of application No. 09/326,043, filed on Jun. 4, 1999, now Pat. No. 6,490,698.

(51) Int. Cl.
*G06F 11/00* (2006.01)
(52) U.S. Cl. .......................................... 714/43; 709/220
(58) Field of Classification Search .................. 714/43, 714/44, 47, 48, 37, 49; 709/220, 223, 225, 709/228
See application file for complete search history.

(56) References Cited

U.S. PATENT DOCUMENTS

| | | | |
|---|---|---|---|
| 4,672,632 A | 6/1987 | Andersen | |
| 5,493,692 A | 2/1996 | Theimer et al. | |
| 5,544,321 A | 8/1996 | Theimer et al. | |
| 5,555,376 A | 9/1996 | Theimer et al. | |
| 5,603,054 A | 2/1997 | Theimer et al. | |
| 5,611,050 A | 3/1997 | Theimer et al. | |
| 5,615,342 A | 3/1997 | Johnson | |
| 5,790,801 A | 8/1998 | Funato | |
| 5,812,865 A | 9/1998 | Theimer et al. | |
| 5,859,979 A | 1/1999 | Tung et al. | |

(Continued)

OTHER PUBLICATIONS

Andy Harter, et al., A Distributed Location System for the Active Office, IEEE Network, 1994, pp. 62-70.

(Continued)

*Primary Examiner*—Nadeem Iqbal
(74) *Attorney, Agent, or Firm*—Amin & Turocy, LLP

(57) ABSTRACT

A system and method for identifying ideal channels for communications based on an analysis of communication channel reliability, communicating party preferences, and communicating party contexts is provided. The system attempts to optimize the utility of a communication based on inferred or directly accessed channel reliability data, communicating party preferences and communicating party contexts. Such optimization can be achieved using reliabilities, preferences and policies concerning handling the attempted contact based on a deterministic specification or through inferring reliability, context, content and task under uncertainty by employing decision-theoretic inferences. The methods may consider channels currently available as well as channels available at later times. Thus, the service can include automated rescheduling of communications based on a consideration of forecasts of reliability and availability. The approach may include the use of forecasts about the time required for a communication and the likelihood that a connection will be dropped or will lose fidelity over this period of time. The methods may also include a consideration of metadata within a standard schema that is transmitted along with a communication attempt, the metadata representing information about attributes like the potential communication channels, the identity of the contactor, the task at hand, and the context of the communicating parties. The invocation of the communication service may be performed in a variety of ways, including single button invocations, and via a communication service that is more deeply integrated with other applications and functionalities.

46 Claims, 23 Drawing Sheets

U.S. PATENT DOCUMENTS

| | | | |
|---|---|---|---|
| 5,893,075 A | 4/1999 | Plainfield et al. | |
| 5,960,423 A | 9/1999 | Chaudhuri et al. | |
| 5,963,910 A | 10/1999 | Ulwick | |
| 6,032,189 A | 2/2000 | Jinzenji et al. | |
| 6,044,486 A | 3/2000 | Underseth et al. | |
| 6,112,098 A | 8/2000 | Flint et al. | |
| 6,163,683 A | 12/2000 | Dunn et al. | |
| 6,167,450 A | 12/2000 | Angwin et al. | |
| 6,181,684 B1 | 1/2001 | Turcotte et al. | |
| 6,188,905 B1 | 2/2001 | Rudrapatna et al. | |
| 6,212,550 B1 | 4/2001 | Segur | |
| 6,272,146 B1 | 8/2001 | Bowater et al. | |
| 6,336,194 B1 | 1/2002 | Dahman et al. | |
| 6,385,454 B1 | 5/2002 | Bahl et al. | |
| 6,438,217 B1 | 8/2002 | Huna | |
| 6,438,603 B1 | 8/2002 | Ogus | |
| 6,463,265 B1 | 10/2002 | Cohen et al. | |
| 6,466,232 B1 | 10/2002 | Newell et al. | |
| 6,493,685 B1 | 12/2002 | Ensel et al. | |
| 6,513,046 B1 | 1/2003 | Abbott, III et al. | |
| 6,549,915 B1 | 4/2003 | Abbott, III et al. | |
| 6,587,876 B1 | 7/2003 | Mahon et al. | |
| 6,654,734 B1 | 11/2003 | Mani et al. | |
| 6,738,931 B1 * | 5/2004 | Osborn et al. | 714/37 |
| 6,747,675 B1 | 6/2004 | Abbott et al. | |
| 6,791,580 B1 | 9/2004 | Abbott et al. | |
| 6,801,223 B1 | 10/2004 | Abbott et al. | |
| 6,812,937 B1 | 11/2004 | Abbott et al. | |
| 6,842,877 B1 | 1/2005 | Robarts et al. | |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2002/0032689 A1 | 3/2002 | Abbott, III et al. | |
| 2002/0044152 A1 | 4/2002 | Abbott, III et al. | |
| 2002/0052930 A1 | 5/2002 | Abbott et al. | |
| 2002/0052963 A1 | 5/2002 | Abbott et al. | |
| 2002/0054130 A1 | 5/2002 | Abbott, III et al. | |
| 2002/0054174 A1 | 5/2002 | Abbott et al. | |
| 2002/0078204 A1 | 6/2002 | Newell et al. | |
| 2002/0080155 A1 | 6/2002 | Abbott et al. | |
| 2002/0080156 A1 | 6/2002 | Abbott et al. | |
| 2002/0083025 A1 | 6/2002 | Robarts et al. | |
| 2002/0083158 A1 | 6/2002 | Abbott et al. | |
| 2002/0087525 A1 | 7/2002 | Abbott et al. | |
| 2002/0099817 A1 | 7/2002 | Abbott et al. | |
| 2002/0112056 A1 | 8/2002 | Baldwin et al. | |
| 2002/0118772 A1 | 8/2002 | Lin | |
| 2002/0138572 A1 | 9/2002 | Delany et al. | |
| 2002/0156879 A1 | 10/2002 | Delany et al. | |
| 2002/0161862 A1 * | 10/2002 | Horvitz | 709/220 |
| 2002/0174199 A1 * | 11/2002 | Horvitz | 709/220 |
| 2003/0004679 A1 * | 1/2003 | Tryon et al. | 702/182 |
| 2003/0023711 A1 | 1/2003 | Parmar et al. | |
| 2003/0033421 A1 | 2/2003 | Haeri et al. | |
| 2003/0046401 A1 | 3/2003 | Abbott et al. | |
| 2003/0097485 A1 * | 5/2003 | Horvitz et al. | 709/313 |
| 2003/0154476 A1 | 8/2003 | Abbott, III et al. | |
| 2004/0143636 A1 * | 7/2004 | Horvitz et al. | 709/207 |
| 2005/0034078 A1 | 2/2005 | Abbott et al. | |

OTHER PUBLICATIONS

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38-No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In The 14th International Conference on Distributed Computing Systems, Jun. 1994. pp. 29-38.

Andrew Silver, John Larkins and Dave Stringer, "Unified Network Presence Management", Nortel Networks Wireless Solutions, 6 pages.

European Search Report dated Aug. 28, 2003, for International Application Serial No. 02000906.4-1244.

Kaushal Kurapati, Srinivas Gutta, David Schaffer, Jacquelyn Martino, and John Zimmerman, A Multi-Agent TV Recorder, Adaptive Systems Department, Philips Research Briarcliff, 2001, 8 pages.

Eric J. Horvitz and Adrian C. Klein, "Utility-Based Abstraction and Categorization", Palo Alto Laboratory, Rockwell International Research, 1993, 8 pages.

Eric J. Horvitz, John S. Breese and Max Henrion, "Decision Theory in Expert Systems and Artificial Intelligence", Jul. 1988, 38 pages.

Eric Horvitz, Andy Jacobs and David Hovel, "Attention-Sensitive Alerting", Microsoft Research, Jul. 1999, 10 pages.

John R. Carlson and Robert W. Zmud, "Channel Expansion Theory and the Experiential Nature of Media Richness Perceptions", Academy of Management Journal, vol. 42, No. 2, 1999, 18 pages.

* cited by examiner

| | COMM. PARTY PREF(S) | CHANNEL TYPE | CHAN. REL. | PROG. CHANNEL REL. | COMM. CONTEXT | COMM. CONT. | EXT. INFO. | ... |
|---|---|---|---|---|---|---|---|---|
| COMM$_1$ | A$_1$ | B$_1$ | C$_1$ | D$_1$ | E$_1$ | F$_1$ | G$_1$ | ... |
| COMM$_2$ | A$_2$ | B$_2$ | C$_2$ | D$_2$ | E$_2$ | F$_2$ | G$_2$ | ... |
| COMM$_3$ | A$_3$ | B$_3$ | C$_3$ | D$_3$ | E$_3$ | F$_3$ | G$_3$ | ... |
| COMM$_4$ | A$_4$ | B$_4$ | C$_4$ | D$_4$ | E$_4$ | F$_4$ | G$_4$ | ... |
| • | • | • | • | • | • | • | • | ... |
| • | • | • | • | • | • | • | • | ... |
| • | • | • | • | • | • | • | • | ... |
| COMM$_Z$ | A$_Z$ | B$_Z$ | C$_Z$ | D$_Z$ | E$_Z$ | F$_Z$ | G$_Z$ | ... |

SYSTEM FOR PERFORMING CONTEXT-SENSITIVE DECISIONS ABOUT IDEAL COMMUNICATION MODALITIES CONSIDERING INFORMATION ABOUT CHANNEL RELIABILITY

REFERENCE TO RELATED APPLICATIONS

This application is a continuation-in-part of U.S. patent application Ser. No. 09/809,142, which was filed Mar. 15, 2001, entitled System and Method For Identifying and Establishing Preferred Modalities or Channels for Communications Based on Participants' Preferences and Contexts. This application is also a continuation-in-part of U.S. patent application Ser. No. 09/326,043, which was filed Jun. 4, 1999 now U.S. Pat. No. 6,490,698, entitled A Multi-Level Decision-Analytic Approach to Failure and Repair in Human-Computer Interactions.

TECHNICAL FIELD

The present invention relates generally to a system for identifying and establishing communications policies that consider the reliability of possible communication channels as a determining factor. More particularly, the present invention relates to a system for facilitating identifying optimal communication channels between contactors and contactees based on reasoning performed on deterministic and/or uncertain communication channel data, contactee and/or contactor preferences, capabilities and context, both present and predicted, where such predictions may be made, for example, by decision-theoretic policies.

BACKGROUND OF THE INVENTION

With the ever-increasing variety of communication channels available, it has become increasingly valuable to select channel(s) by which the utility of communications between contactees and contactors can be maximized. The utility of a communication can be measured by examining a variety of factors like cost and value. Communicating parties have available diverse communication choices that include, but are not limited to, computer based communication (e.g., instant messaging, on-line chat, text email, voice email, voice over IP (VOIP), collaborative editing, webcam conversations), telephone based communication (e.g., cell phone, satellite phone, personal digital assistant (PDA) phone, Internet telephony, plain old telephone system (POTS)) and face to face communication (e.g., personal meeting, video conferencing). Thus, communicating parties are faced with the daunting task of selecting a best possible means to communicate among a plurality of communication options.

Conventionally, a single channel (e.g., long distance POTs telephone call) communication may be routed based on factors like load, but such load-balancing methods typically do not account for other factors that may influence the reliability of a communication channel and thus the likelihood that the communication may be degraded. By way of illustration, the likelihood that a communication will suffer degradation may depend on a factor like the duration of the communication. For example, an hour long cellular telephone call may be more likely to suffer from degradation than a one minute cellular telephone call based on factors like the increased probability that the cellular phone will transit a cellular dead zone and/or the increased probability that the cellular phone battery will run out of power. Conventional cellular telephone routing algorithms may account for load balancing factors but typically do not account for other factors (e.g., predicted transit route, predicted length) that may influence the likelihood that a communication will be degraded.

Furthermore, security issues introduce another parameter in selecting a communication channel. A communication that is difficult to compromise (e.g., intercept, decipher, alter), for example a 128 bit, public/private key encrypted email, or a frequency agile, multi-mode encryption radio signal, may be considered more reliable than one that is more easily compromised (e.g., clear text email, single frequency cellular call). Thus, the task of communicating parties in choosing a "best" communication channel is even more complicated by security considerations.

Conventionally, a contactor had limited means, if any, to determine which, if any, communication method(s) would be best to communicate with a contactee. Similarly, a contactee had limited contact control methods. In view of at least the above, there is a strong need in the art for a system and/or methodology to facilitate selecting an optimal communication channel given a particular set of parameters.

SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. Its sole purpose is to present some concepts of the invention in a simplified form as a prelude to the more detailed description that is presented later.

The present invention relates to a system and method to facilitate maximizing utility of a communication based at least in part upon factoring predicted reliability of a communication channel into a utility analysis to produce a reliability-based expected utility. Such maximizing may depend, for example, on the reliability of the communication channel, preferences and context of communicating parties, and in what activities, if any, the parties are engaged or are likely to be engaged in the future. The reliability of a communication channel may vary, for example, based on factors including, but not limited to, load, time of day, atmospheric conditions, location of one or more of the communicating parties (e.g., in the office, in the car, at home, in the mountains, at sea, in flight, etc.), expected duration of a communication, and attentional status of one or more of the communicating parties.

The reliability analysis of available communication channels can consider factors including, but not limited to, the likelihood that a communication will be degraded (e.g., portion of a communication dropped, garbled), the likelihood that a communication will be disconnected, and the likelihood that a communication will be compromised (e.g., intercepted, decrypted, altered). Such analysis may consider the likelihoods at the time of the communication and at other available times. A system for factoring the predicted reliability of a communication channel into communication analysis may include components such as a channel manager and a reliability analyzer. These components are employed in a communication channel utility analysis to factor a plurality of variables (e.g., channel reliability, communication context, communicating party preferences). The system, by taking into consideration the various variables, facilitates selecting an optimal communication channel, from among a plurality of channels, to employ at a particular state.

The channel manager analyzes respective utilities associated with available communication channels. In the analysis, the channel manager also factors in context (e.g., communication environment, communicating party preferences, communication state), and information from the reliability analyzer regarding the respective reliabilities of the communication channels. The channel manager may analyze, for example, properties associated with a communication that include, but are not limited to, the available communication channels (e.g., computer, telephone, personal), the reliability of such communication channels at various times at which a communication may occur (e.g., now, scheduled later), the preferences of the communicating parties, and the context of the communicating parties.

It is noted that context can be abstracted by examining, for example, a communication sender, the relationship of the sender to a user, the time of day at which the sender is attempting to communicate, the task(s) with which the user and/or sender are engaged, the age of project(s) to which the user and/or sender are engaged, the sender and/or user location and so on. Thus, multiple attributes concerning people, including their preferences, contexts, tasks and priorities are analyzed and to further facilitate establishing and adapting communication policies for people.

The reliability manager analyzes reliabilities of the respective communication channels. The reliability analyzer can be employed, for example, to determine the likelihood that a communication channel will experience a degradation and/or failure during a communication. Factors to consider in such analysis may be represented in channel data associated with the communication and include, but are not limited to, the expected duration of the communication, the desired communication channel(s), the reliability history of the desired communication channel(s), the cost(s) associated with a lost connection, the cost(s) associated with reconnecting, the attentional status and activity of a party, and the utility of a partially completed communication.

The system may also consider the cost(s) associated with a lost connection when determining along which channel(s) a communication should proceed. Such costs may vary depending on the identity of the parties, the subject matter of the communication and the context of the parties. The costs associated with a lost connection may include, but are not limited to, frustration factors, monetary costs, opportunity costs, time delay costs and embarrassment costs. Similarly, the system may consider the cost(s) associated with reconnecting when analyzing the channels for a communication. Again, such costs may vary depending on the identity of the parties, the subject matter of the communication and the context of the parties. The costs associated with reconnecting may include, but are not limited to, monetary costs, time delay costs, resource consumption costs, frustration costs and embarrassment costs (e.g., having a company look like they are incapable of performing a desired business function in front of a prospective client).

The system may also analyze the utility of a partially completed communication. For example, the goal of a first communication may be to relate a lengthy piece of highly important data between two parties where the data has no value unless it is transmitted one hundred percent intact. The utility of partially completing such a first communication is low. But the goal of a second communication may be to relate a list of small, independent pieces of relatively unimportant data between two parties where each small piece of data has independent value. There is a utility in partially completing such a second communication.

Thus, when determining the utility of a communication via a channel, the system may consider factors including, but not limited to, the reliability of the channel, the parties, the subject matter of the communication, the preferences of the communicating parties, the context of the parties and the costs of (dis)(re)connecting.

In one example of the present invention, the reliability analyzer includes a reliability predictor and a reliability prediction integrator. The reliability predictor generates a probability that a communication will be completed with desired transmission qualities. The reliability prediction integrator updates one or more pieces of information that are employed in selecting a channel for a communication and/or updates an expected utility that was computed without regard to reliability. Thus, predictions associated with the reliability of a communication can be factored into the decision to employ a certain channel.

The present invention facilitates determining optimal communication channels between contactors and contactees based on information, either complete or incomplete, associated with the communication channels, the contactees and/or the contactors. Based on the identified optimal communication channel, one or more communications may be scheduled, calendared and/or initiated via reliable channels in real-time between the contactor and contactee. The scheduled communication may rely on the current communication channel reliability, communicating party context and preferences and/or on predictions concerning the likelihoods that different communication channels will become available, predictions concerning the reliability of such communication channels and/or the likelihood that the context of the communicating parties will become more optimal. Alternatively and/or additionally, the invention can display communication choices, predicted utilities and predicted channel reliabilities to facilitate a communicating party (e.g., human, computer) selecting a communication channel.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 15 schematically illustrates a representative data structure in connection with the subject invention.

DETAILED DESCRIPTION

Figure 1:
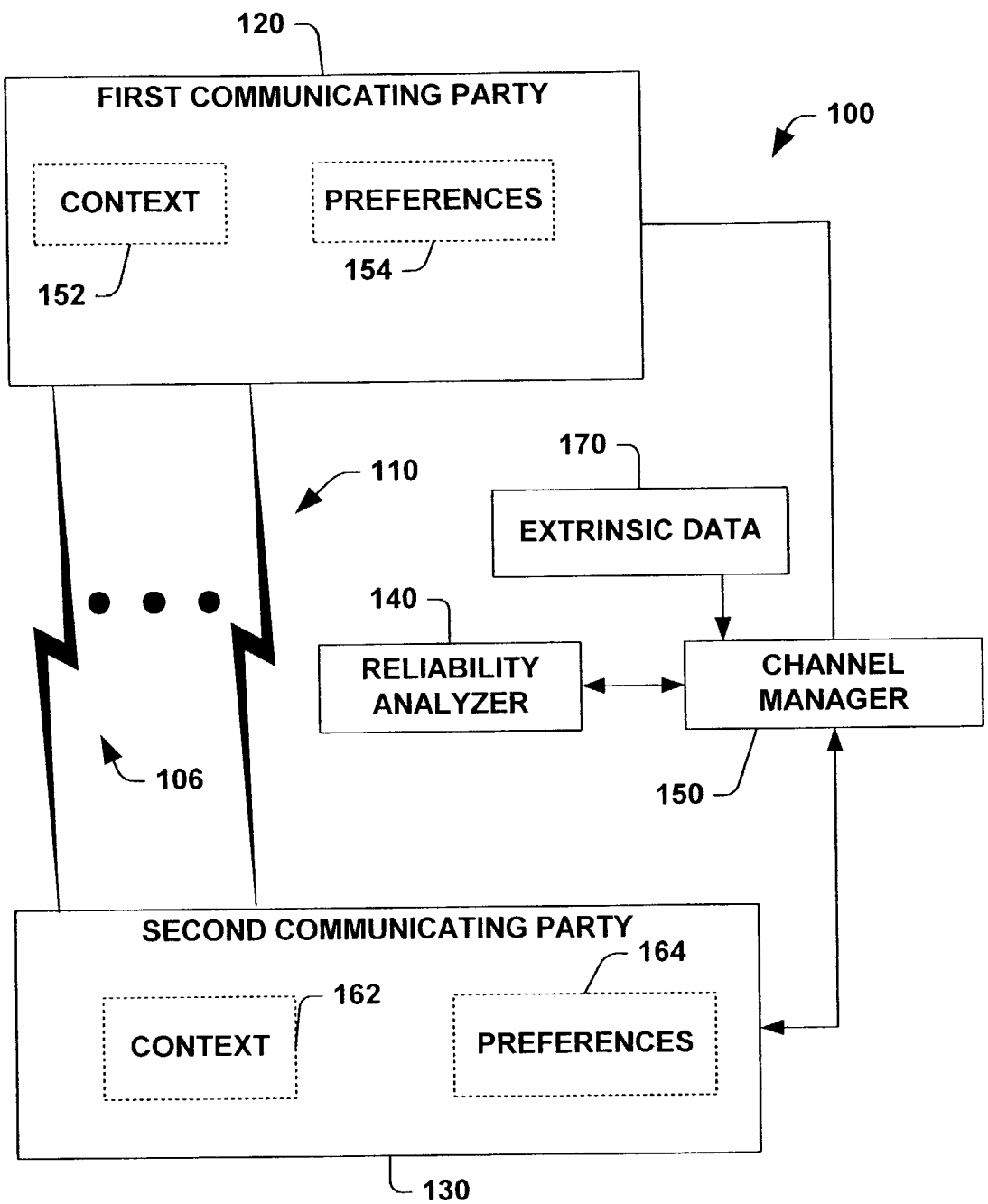
FIG. 1 is a schematic block diagram of a system for identifying a communication channel that facilitates maximizing the utility of a communication via that channel, where the system accounts for the reliability of the communication channel, in accordance with an aspect of the present invention.

The present invention is now described with reference to the drawings, where like reference numerals are used to refer to like elements throughout. In the following description, for purposes of explanation, numerous specific details are set forth in order to provide a thorough understanding of the present invention. It may be evident, however, to one skilled in the art, that the present invention may be practiced without these specific details. In other instances, well-known structures and devices are shown in block diagram form in order to facilitate description of the present invention.

As used in this application, the term "computer component" is intended to refer to a computer-related entity, either hardware, a combination of hardware and software, software, or software in execution. For example, a computer component may be, but is not limited to being, a process running on a processor, a processor, an object, an executable, a thread of execution, a program and a computer. By way of illustration, both an application running on a server and the server can be computer components. One or more computer components may reside within a process and/or thread of execution and a computer component may be localized on one computer and/or be distributed between two or more computers.

It is to be appreciated that various aspects of the present invention employ representations of deterministic policies specified as functions or rules that take as arguments contextual information, details about the nature of the participants, and the content or task at hand. One example of the present invention also employs technologies associated with facilitating inference and decision making under uncertainty and optimization of expected utility and/or minimization of expected costs. Thus, statistical inference can be performed with models constructed by hand, from data with machine learning methods, or by a mixture of machine learning and human assessment. Such models can be used in conjunction with deterministic policies where, depending on the context, an inferential rule or deterministic rule is used. A variety of machine learning systems/methodologies including Bayesian learning methods that search over alternative dependency structures and apply a score (such as the Bayesian Information Criteria, etc.), Bayesian classifiers and other statistical classifiers, including decision tree learning methods, support vector machines, linear and non-linear regression, and neural network representations, can be employed to build and update inferential models.

FIG. 1 is a schematic block diagram of a system 100 for identifying a communication channel from among one or more communication channels 106 that facilitates maximizing the utility of a communication 110 between a first communicating party 120 and a second communicating party 130 via that channel. The system 100 performs a utility analysis on the communication channels 106 to determine the channel that maximizes the utility of a communication between the parties 120 and 130. One example utility calculation can yield a preference-based expected utility based, at least in part, on analyzing the communication utility by factoring the preferences of the communicating party(s). The utility analysis factors a plurality of variables (e.g., type of communication channel, costs of employing a channel, communicating party preference, communication context, communication content, communication channel reliability). By taking into consideration at least some of the above-noted variables (as well as possible other variables), the system 100 facilitates maximizing communication utility. While two communicating parties are illustrated in FIG. 1, it is to be appreciated that the present invention can be employed with a greater number of communicating parties.

Figure 16:
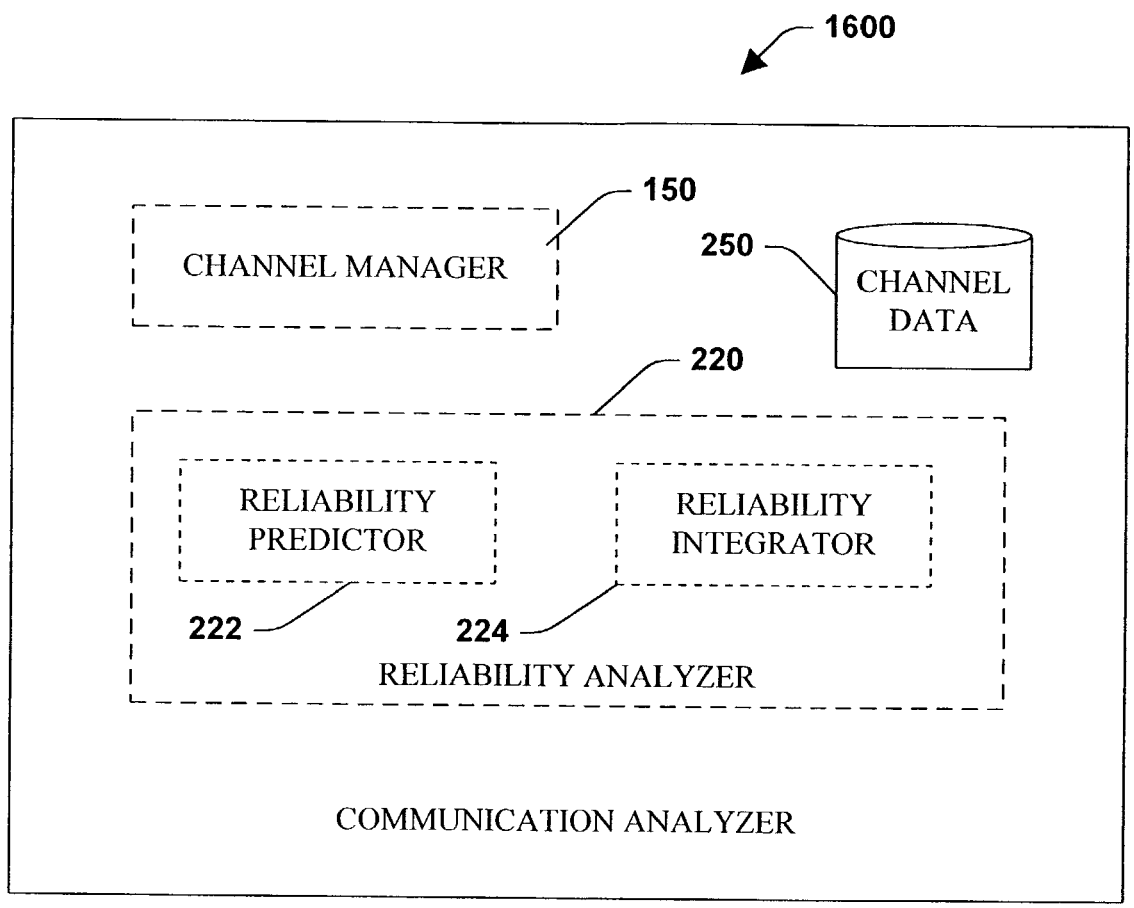
FIG. 16 schematically illustrates a communication analyzer in connection with the present invention.
Figure 17:
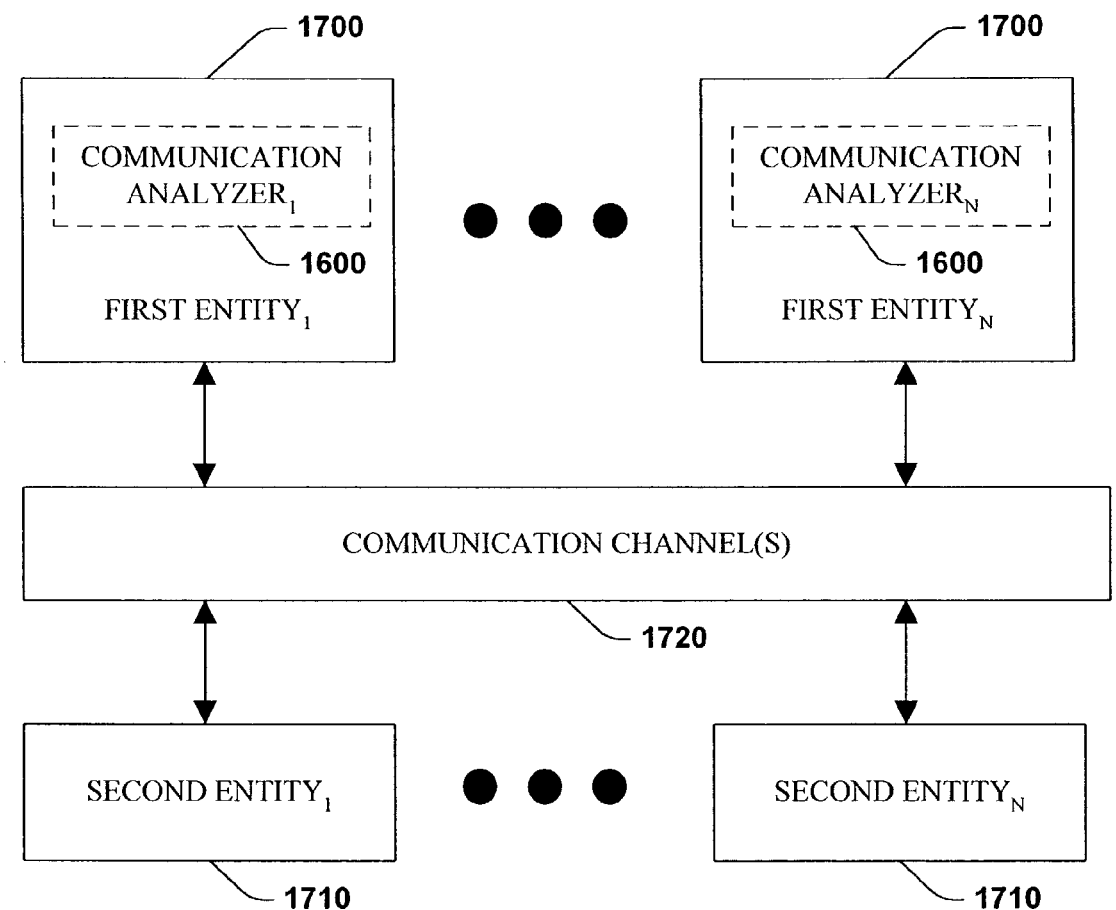
FIG. 17 schematically illustrates an architectural application of the subject invention with respect to a plurality of communicating entities.

Furthermore, it is to be appreciated that although the invention is discussed in large part with respect to maximizing utility of a communication between two or more parties, the invention can be employed from the viewpoint of a single communicating party so as to maximize the communication utility to the single party. Communications that may occur via channels in accordance with the present invention can include, but are not limited to, telephone channels (e.g., POTS, cellular, satellite, Internet), facsimile channels, computer channels (e.g., instant messaging, collaborative editing, email, chats), paging channels, radio channels, television channels (e.g., picture in picture, information dialog) and personal channels (e.g., courier, face-to-face) and can be processed by the present invention. The present invention can be employed as part of a single device, a cluster of devices, a system and/or a network for example. FIGS. 16–17 discuss in greater detail various architectural applications of the subject invention—it is to be appreciated that such applications are merely exemplary and are not intended to exhaust the variety of applications of the subject invention.

Expected utility optimization in connection with the subject invention can be based at least in part on a variety of other factors such as for example: (1) whether two or more communicating parties are concurrently engaged in a related activity; (2) whether two or more communicating parties are likely to become concurrently engaged in a related activity; (3) whether two or more communicating parties are concurrently engaged in a similar activity; (4) whether two or more communicating parties are likely to become concurrently engaged in a similar activity; (5) whether two or more communicating parties are concurrently processing one or more related documents; (6) whether two or more communicating parties are likely to concurrently process one or more related documents; (7) whether two or more communicating parties are concurrently viewing one or more related documents; (8) whether two or more communicating parties are likely to concurrently view one or more related documents; (9) whether two or more communicating parties are concurrently engaged in a shared project; (10) whether two or more communicating parties are likely to become concurrently engaged in a shared project; (11) whether two or more communicating parties are scheduled to communicate within a pre-defined period of time; (12) whether two or more communicating parties have communicated within a pre-defined period of time; (13) whether two or more communicating parties are scheduled to meet within a pre-defined period of time; (14) whether two or more communicating parties have met within a pre-defined period of time; (15) whether a communicating party has engaged in one or more pre-defined activities of interest within a pre-defined period of time; (16) whether a communicating party is likely to engage in one or more pre-defined activities of interest within a pre-defined period of time; (17) whether a communicating party has purchased one or more pre-defined items of interest; (18) whether a communicating party has registered an interest in one or more pre-defined items of interest; (19) the degree to which a communicating party is trusted by one or more other communicating parties.

It is to be appreciated that the aforementioned list of factors that can be employed in connection with the subject invention can be considered individually or a subset of the factors considered concurrently. Moreover, it is understood that the above list is merely exemplary and should not be considered exhaustive of the variety of factors that could be considered in connection with facilitating utility optimization in connection with the subject invention.

The system 100 includes a reliability analyzer 140 that can be employed to analyze the reliability of the channel. The reliability analyzer 140 can be a computer component, as that term is defined herein. The reliability of the channel(s) along which the communication 110 will travel may vary depending on factors including, but not limited to, load, time of day, atmospheric conditions, location, desired throughput, desired isolation, and the like. Analyses from the reliability analyzer 140 can be shared with a channel manager 150 that can be employed to facilitate selecting the communication channel that will maximize the utility of the communication 110 between the communicating parties. The channel manager 150 can be a computer component as that term is defined herein. The reliability analyzer 140 is not limited to analyzing communications between two parties or to a single communication channel between two parties. It is to be appreciated that multiple channels and/or multiple communicating parties can be treated as increased sets of alternatives that may complicate utility maximizing computations without changing the fundamental process of identifying and establishing one or more communications based on the channel reliability, preferences, contexts and capabilities of the communicating parties. One example analysis performed by the reliability analyzer 140 can yield a reliability-based expected utility that is based, at least in part, on the reliability associated with a channel.

The system 100 increases the utility of a communication between communicating parties by employing the reliability analyzer 140 and channel manager 150. The reliability analyzer 140 analyzes the reliability of a communication channel and computes a reliability-based expected utility of a communication if it employs the communication channel. The channel manager 150 analyzes at least one of communicating party preferences and context to determine a preference-based expected utility of the communication. The channel manager 150 employs the reliability-based expected utility of the communication and the preference-based expected utility of the communication to facilitate determining if the communication channel 110 maximizes the utility of the communication between the communicating parties 120 and 130.

In identifying communication channels that may maximize the utility of the communication 110 between the communicating parties, the channel manager 150 may consider context and preference information in association with the predicted reliability information provided by the reliability analyzer 140. Thus, the channel manager 150 can analyze a context 152 and preferences 154 associated with the first communicating party 120 and a context 162 and preferences 164 associated with the communicating party 130. Such context may affect the reliability of a channel. For example, if the context includes information concerning the location of the communicating party (e.g., in a tunnel), then the reliability of a satellite phone communication (which requires line of sight) may be affected. The preferences may include information concerning a desired reliability. For example, a first communicating party may be ambivalent concerning the reliability of communications and may, therefore, be willing to accept communications of any reliability, while a second communicating party may prefer to receive communications that are predicted to be at least ninety-nine percent reliable. Also, extrinsic data 170 (e.g., communication environment, time of day, weather, communication content, communication context) can be considered by the channel manager 150 in performing the utility analysis. It is to be appreciated that the present invention can employ metadata associated with any of the various hardware and/or software components and/or considered data described herein to facilitate performing a utility analysis as described herein.

Thus, based on the analysis of the context and preferences of the communicating parties, the predicted reliability of candidate communication channels, and extrinsic data, the channel manager 150 can identify the communication channel(s) that will maximize the utility of a communication, providing advantages over conventional systems.

Concerning utility of a communication, the value of a current potential communication can be evaluated by considering a measure of the history of utility of communication, attributes of the communication that can be stored as metadata (e.g., intended focus of communication, nature of communication channel, reliability of communication channel), and/or combinations thereof. Such an expected utility can be computed through the use of decision models such as influence diagrams, which encode a set of random variables, representing key aspects of context, cost, and value, as well as potential communication actions, and overall preferences about outcomes. Such models represent deterministic variables as we as probability distributions over states based on observations or attributes associated with the communication, setting, and so on. In other equivalent approaches, we employ Bayesian networks or other statistical inference methods and then couple the output of the probabilistic inference models with a second layer of analysis considerating preferences, and employing the principles of maximum expected utility for optimization provides a useful method for computing the value of different communication actions. In one example of the present invention, utility represents communication effectiveness correlated to adherence to user preferences. Such effectiveness can be measured by factors including, but not limited to, reliability achieved on the communication channel, quantity of information content transferred, quality of information content transferred, and relevancy of information content transferred.

An expected utility function takes into consideration probability distributions over future outcomes and user preferences while reasoning under uncertainty. An example expected utility function can be calculated using:

$$E[u(d_i,c)] = s_j \epsilon s \Sigma u(s_j, d_i) p(s^j | d_i, c),$$

Where $p(s_j|d_i,c)$ represents the probability of achieving a future state $s_j$ given a decision d, concerning situation c, capturing communication channel parameters, nature of the contactor and a context for the contactee. Each individual outcome state $s_j \epsilon s$ represents a possible match of preferences to related communication parameters. The function $u(s_j, d_i)$ represents the utility of state $s_j$ after the decision $d_i$ has been made.

Assume that the present invention considers two possible utilities, $U_{high}$ and $U_{low}$. Based on selecting particular communication parameters (e.g., time, media, location), the system 10 can compute $P_{high}$ and $P_{low}$, the probabilities of achieving $U_{high}$ and $U_{low}$, where $P_{high}=1-P_{low}$ Although two utility states are identified, it is to be appreciated that a greater number of utility states can be employed with the present invention. The expected utility of a decision $d_i$ is then:

$$E(d_i) = P_{high}U_{high} + P_{low}U_{low}.$$

After computing the $d_i \epsilon D$, the system 10 can select the decision d* where $d^* = \arg \max\ d_i \epsilon DE[u(d_i,c_j)]$, where d* represents the decision associated with maximum expected utility E.

A high utility can be associated with, for example, a large amount of valuable information being transferred. A low utility can be associated with, for example, a small amount of valuable information being transferred. Similarly, a low cost can be associated with a low drain on the attentional resources of the contactee, as might be captured by a low interruptability factor (e.g., user does not have to leave important meeting or shut down an application) and with a low amount of "hanging" (e.g., the number, type and/or importance of people and/or resources left waiting for the return of the attentional resource of the user). A high cost can be associated with a significant drain on the attentional resources of the contactee, as might be associated with an action of high interruptability (e.g., pulling a person from an important meeting) leaving many important people waiting. The utilities can take into consideration both the value and the disruptiveness of communication outcomes, combining the costs and benefits in a single assessment or explicitly breaking out the cost and benefits of the communication, and providing a means for coupling the two together (e.g., employing an additive multi-linear model, summing costs and benefits after selective weighting of the separate factors).

In addition, the utility of the communication can be evaluated according to formulae that consider the cost of the communication and the value of the communication as viewed from the points of view of both a sender and a receiver. An exemplary formula can take the form:

$$\text{utility} = u(\text{cost}_S, \text{value}_S, \text{cost}_R, \text{value}_R),$$

The utility calculations may weight the costs and/or benefits to the contactors and/or contactees differently. By way of illustration, the value can be computed via a combination function f of other functions g and h that operate separately on the costs and the benefits to the contactor (the sender) and the contactee (recipient of the initial communication) as follows:

$$\text{utility} = f(g[(\text{value}_S * w1), (\text{cost}_S * w3)], h[(\text{value}_R * w2), (\text{cost}_R * w4)]).$$

By way of further illustration, consider a case where the value is a function of the difference of the costs and the benefits to the contactor and the contactee, as follows:

$$\text{utility} = f([(\text{value}_S * w1) - (\text{cost}_S * w3)], [(\text{value}_R * w2) - (\text{cost}_R * w4)]).$$

One example of such a difference function employs a multi-linear weighted combination of the separate terms for contactee and contactor, $$\text{utility} = w_S[(\text{value}_S * w1) - (\text{cost}_S * w3)] + w_R [(\text{value}_R * w2) - (\text{cost}_R * w4)]).$$

For such a formulation, diminishing $w_S$ to zero, removes the preferences of the contactor, and makes communication decisions depend on the preferences of the contactee. Diminishing $w_R$ to zero, makes communication decisions depend on the preferences of the contactor. Such adjustments to the weights, which can lead to diminutions and/or enhancements of the relative importance of the contactor and/or contactee costs and/or benefits. Similarly, weights can be affected by context (e.g., time, location, activity). The cost to the sender ($\text{cost}_S$) can be analyzed by examining a set of cost factors $\text{cost}_S = \{a, b, c, \ldots\}$ that can include, but are not limited to, the cost of making a connection instantly, the cost of making a connection at a later time, the cost of employing a particular channel and/or set of channels and the cost of not making a connection, where the costs may include actual costs and/or expected costs. Such costs can be measured by actual and/or opportunity cost in time, communication resources and/or human resources.

The value to the sender ($\text{value}_S$) can also be analyzed by examining a set of value factors $\text{value}_S = \{m, n, o, \ldots\}$ that can include, but are not limited to, the value of making an instant connection, the value of making a later connection and the value of employing a particular channel and/or set of channels, where the values can include actual values and/or expected values. The values can similarly be measured by actual and/or opportunity cost of time, communication resources, dollars, and/or human resources. The expected costs and/or expected values can be computed through deterministic processing and/or reasoning under uncertainty.

The cost to the receiver ($cost_R$) can be analyzed by examining a set of cost factors $cost_R=\{x, y, z, \ldots\}$ that can include, but are not limited to, the cost of making a connection instantly, the cost of making a connection at a later time, the cost of employing a particular channel and/or set of channels and the cost of not making a connection, where the costs can include actual costs and/or expected costs. Such costs and/or values can be measured by actual cost in time, money, human resources, and/or opportunity cost in time, money, human resources and/or communication resources, for example.

The value to the receiver ($value_R$) can also be analyzed by examining a set of value factors $value_R=\{p, q, r, \ldots\}$ that can include, but are not limited to, the value of making an instant connection, the value of making a later connection and the value of employing a particular channel and/or set of channels, where the values can include actual values and/or expected values. The expected costs and/or expected values can be computed through reasoning under uncertainty. The costs can vary over time, thus, a first set of costs $cost_S T_0$ computed for a first time $T_0$ may not be equal to a second set of costs $cost_S T_1$ computed for a second time $T_1$. Similarly, the values can vary over time and a first set of values $value_S T_0$ may not be equal to a second set of values $value_S T_1$. Thus, rather than producing a single value, the system 100 can produce a set of expected utilities for the communications via a plurality of communication channels.

While the reliability analyzer 140 and the channel manager 150 are illustrated as separate blocks, it is to be appreciated that the reliability analyzer 140 and the channel manager 150 may be implemented as a single apparatus, program and/or process and that such unified apparatus, program and/or process may reside in a single computer and/or process and/or be distributed across two or more computers and/or processes. In one example of the present invention, the channel manager 150 is implemented as a single process executing on a single processor and the reliability analyzer 140 is implemented as a single process residing on the same processor with communications between the processes carried out via various interprocess communication mechanisms (e.g., messaging, function calls, shared memory, signals, interrupts). In another example of the present invention, the channel manager 150 is implemented as a collection of threads that may each be associated with separate processes residing on multiple and/or parallel processors with the reliability analyzer 140 similarly implemented as a collection of threads that may each be associated with separate processes residing on multiple and/or parallel processors. In one example of the present invention, where the reliability analyzer 140 and the channel manager 150 are implemented as processes, computer executable components implementing such processes can be stored on a computer readable medium to facilitate loading such executable components into a computer, for example.

In one example of the present invention, in addition to identifying communication channels that maximize the utility of a communication, the channel manager 150 performs actions including, but not limited to, scheduling a communication (e.g., acquiring network resources), calendaring a communication, displaying information concerning a potential communication channel (e.g., via a user interface displayed to the parties) and initiating a communication (e.g., ringing the phone at all the communicating party locations).

Figure 2:
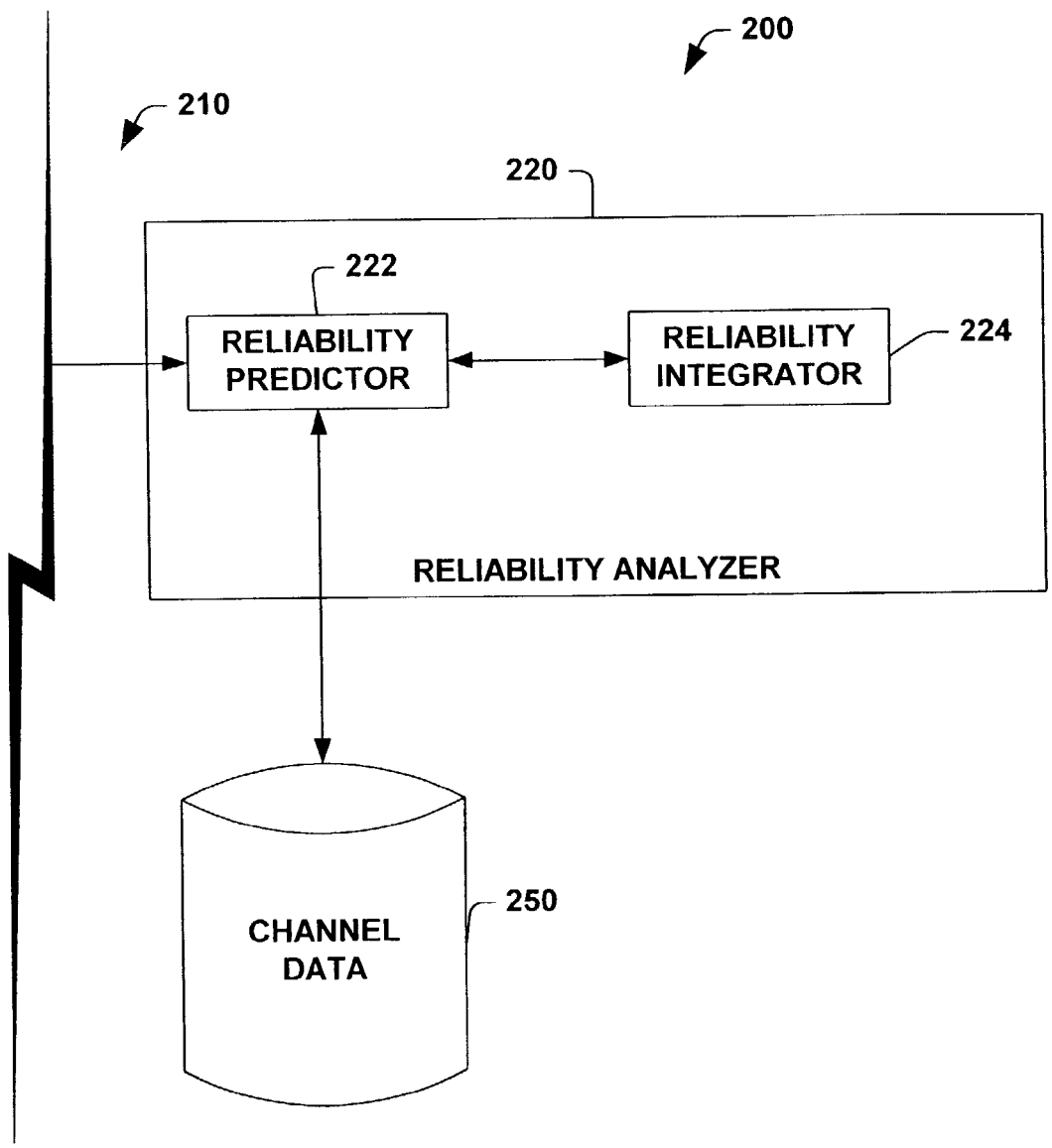
FIG. 2 is a schematic block diagram of a reliability analyzer, in accordance with an aspect of the present invention.

FIG. 2 is a schematic block diagram of a reliability analysis system 200 in accordance with the present invention that performs a prognostic reliability analysis that is employed in performing a communication utility analysis. Thus, in addition to determining the reliability of a communication at a current state, the system 200 also predicts the reliability of communication channel(s) at a future state(s) so as to perform a reliability prognosis. The system 200 includes a reliability analyzer 220 that includes a reliability predictor 222 and a reliability integrator 224. The reliability predictor 222 predicts the reliability of a communication 210, for example. The reliability integrator 224 integrates a reliability-based expected utility with other expected utilities (e.g., preference based expected utility). The reliability analyzer 220 has access to a channel data store 250. While a single data store 250 is illustrated, it is to be appreciated that the data store 250 may be a single data store and/or a plurality of data stores located in a single location and/or distributed at various locations. It is to be appreciated that the reliability analysis system 200 can be employed in the system 100 (FIG. 1).

The reliability predictor 222 can consider various factors associated with the communication 210 in predicting the reliability of the communication. One factor that is considered in predicting the reliability of a communication is the length of the communication. For example, a longer communication may be more subject to degradation due to more opportunities for failure. For some communications, the length may be known. By way of illustration, the length of an email message, or a file transfer may be determined. However, for other communications, the length may not be known (e.g., the length of a phone call may not be predetermined, although it may be inferred). Thus, the length of the communication may be predicted, for example, by analyzing historical data associated with previous communications between the communicating parties that occurred via the channels being considered.

The historical data may not be stored directly but may be represented, for example, in information stored in one or more data fields (e.g., likelihood that phone communication will exceed five minutes, likelihood that email communication will include more than one megabyte of data). The duration of the communication may depend on factors like the parties, the subject matter of the communication and the time of day, for example. By way of illustration, two doctors may typically have lengthy daytime phone conversations concerning the treatment of a patient but may typically send short emails concerning scheduling a time to jog.

Data stored in the channel data store 250 can include, but is not limited to, reliability history of the communication channel, reliability history of a current communication, communication length, communication type, mean time between failure of the communication channel, average failure duration of the communication channel, average percent degradation of the communication channel, atmospheric conditions, scheduled communication channel maintenance and scheduled communication channel downtime. Such data can be analyzed in connection with status information gathered concerning the channel. For example, such status data can include data like channel load, and the like.

In one example of the present invention, the reliability predictor 222 fashions its output as a numerical value indicating the likely reliability of a communication along an analyzed channel. By way of illustration, the reliability predictor 222 may score the reliability as an integer between zero and one hundred percent likelihood that the communication will remain undegraded. By way of further illustration, the reliability predictor 222 may score the reliability as a real number between 0.0 and 1.0 that indicates the predicted degradation. In another example of the present invention, the reliability predictor 222 may produce a likelihood function that relates the likelihood of achieving a desired level of reliability. For example a function f(reliability) may return the likelihood that the desired reliability will be achieved and/or maintained. In another example of the present invention the reliability predictor may provide separate information on the likelihood that a connection will be dropped and the likelihoods that there will be different variables losses of fidelity of the communication channel. Such likelihoods can be made functions of the duration t of the communication. The reliability predictor may indicate that the probability that a connection will be lost may grow significantly as a function of the duration of a communication.

Since the channel data 250 upon which the reliability predictor 222 operates may not be deterministic, the reliability predictor 222 may be required to reason under uncertainty. Thus, the likelihood function Lf may take the form of a probability or probability distribution over reliability:

$$Lf=p(\text{reliability}|E_1)$$

wherein $E_1$ is evidence that has been observed and/or inferred concerning the communication channel.

Similarly, since the party data upon which the reliability predictor 222 operates may not be deterministic, the reliability predictor 222 may be required to reason further under uncertainty. Thus, the likelihood function Lf may take the form:

$$Lf=p(\text{reliability}|E_1, E_2)$$

wherein $E_2$ is evidence that has been observed and/or inferred concerning the communicating parties (e.g., context, preferences).

It is noted that the reliability predictor can be decomposed into separate predictors of the likelihood of a call being dropped or different losses of fidelity occurring. Thus, the present invention may explicitly encode and employ probability distributions over variables representing the likelihoods that there will be a loss of fidelity or loss of connection, and condition these variables on duration t of the communication. The probability that a connection will be lost may grow significantly as a function of the duration of a communication. This information can be employed in a decision model that considers the probability distribution over the duration of a communication given the identity of the contactor, the expected goals of the communication, and other aspects of context of the communication.

Given the rich set of data available concerning the channel 210 and the communicating parties (e.g., context, preferences) the reliability predictor 222, in one example of the present invention, predicts the reliability of the channel 210 using a formula:

$$R(\text{channel})=f(CH\_type, CM\_length, CH\_history, Context\_cp1, Context\_cp2)$$

CH_type—is the channel type
CM_length—is the length of the communication (determined or inferred)
CH_history—is the channel history (e.g., average failures, mean time between failures, duration of failures, severity of failures.)
Context_cp1—is the context of the first communicating party
Context_cp2—is the context of the second communicating party One example formula f(CH_type, CM_length, CH_history, Context_cp1, Context_cp2) is:

$$R(\text{channel})=(r(CH\_type)*w1+r(CM\_length)*w2+r(CH\_history)*w3+r(Context\_cp1)*w4+r(Context\_cp2)*w5)/(w1+w2+w3+w4+w5)$$

The r(factor) component generates the expected reliability based on the factor, and the weighting factors w1 through w5 apply different weights to each factor, where such weights can be configured and programmed to reflect the relative importance of each r(factor).

While two communicating parties are modeled in the formula R(channel), it is to be appreciated that communications between a greater number of communicating parties can be analyzed with the present invention. Furthermore, it is to be appreciated that the formula R(channel) and other formulae described herein are illustrative and are not intended to be limiting. Given the reliability prediction from the formula R(channel), one example of the present invention may further predict the likelihood of achieving that reliability by a formula like:

$$L(R)=p(R(\text{channel})|E_3)$$

wherein $E_3$ is observed and/or inferred evidence concerning the communication channel.

Since data concerning the contexts and/or preferences may also be inferred, the reliability predictor 222 may also predict the likelihood of achieving a reliability by a formula like:

$$L(R)=p(R(\text{channel})|E_3, E_4)$$

wherein $E_4$ is observed and/or inferred evidence concerning the communicating parties.

The reliability predictor 222 may alter the predicted reliability result based on the history of the current communication. For example, an initial prediction that a cellular telephone call has an acceptable reliability may be changed if the attempted communication via the cellular telephone has been dropped three times in less than five minutes. Thus, the reliability analyzer 220 may re-evaluate the reliability and determine that a text message sent to the pager of the recipient may produce a higher utility. Furthermore, such updates and/or overrides may be employed in ongoing machine learning employed to improve the performance of the system 200.

While the reliability predictor 222 and the reliability integrator 224 are illustrated as separate blocks, it is to be appreciated that the reliability predictor 222 and the reliability integrator 224 may be implemented as a single apparatus, program and/or process and that such unified apparatus, program and/or process may reside in a single computer and/or process and/or be distributed across two or more computers and/or processes. Furthermore, computer executable components of the system 200 may be stored on a computer readable medium.

Figure 3:
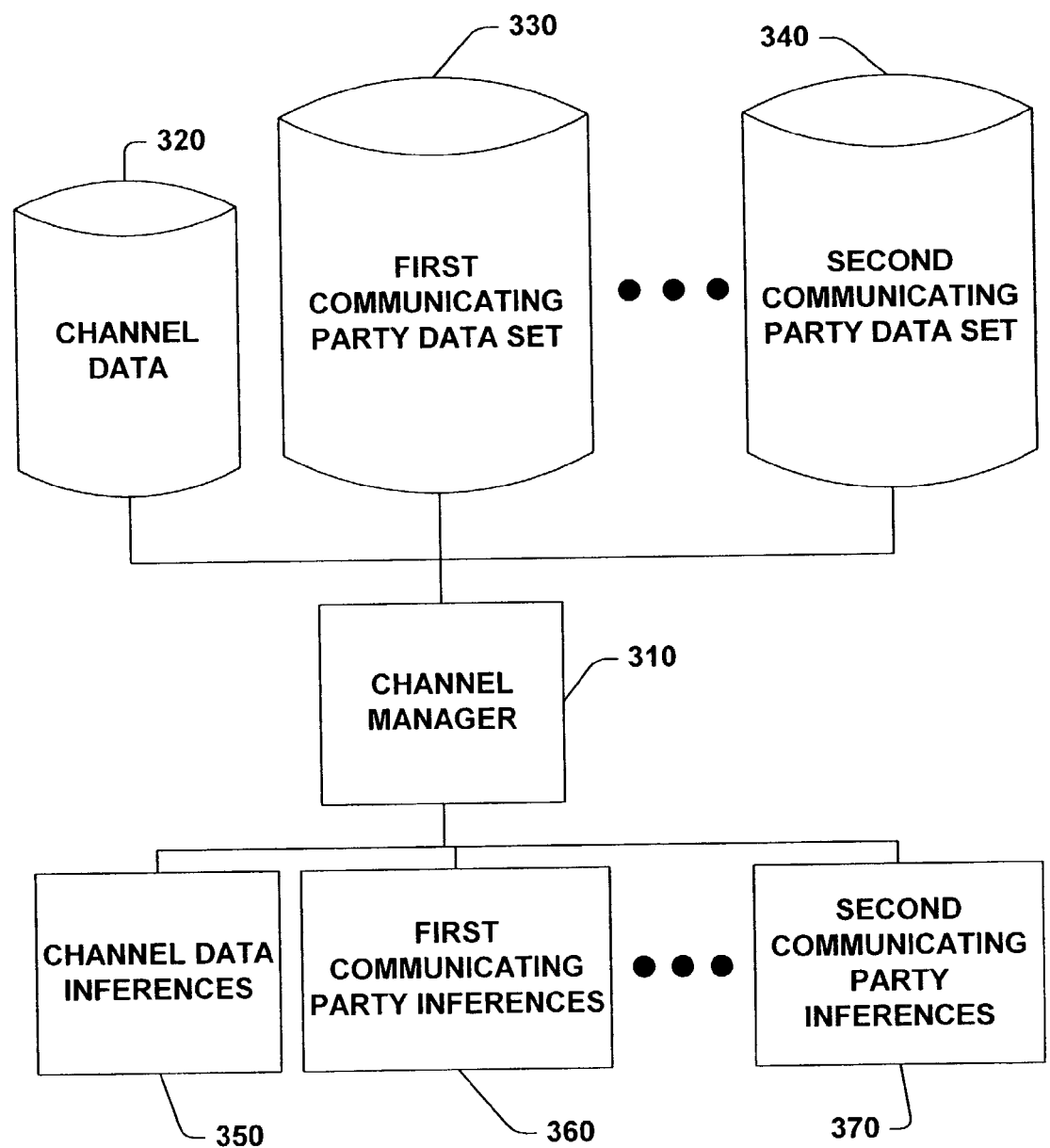
FIG. 3 is a schematic block diagram of a channel manager analyzing deterministic and inferred data, in accordance with an aspect of the present invention.

FIG. 3 is a schematic block diagram of a channel manager 310 analyzing deterministic and inferred data. The deterministic data can include, but is not limited to, deterministic channel data 320, deterministic data 330 associated with a first communicating party and deterministic data 340 associated with a second communicating party. While two communicating parties are illustrated, it is to be appreciated that communications involving a greater number of communicating parties can be analyzed by the present invention. It is to be further appreciated that the communicating parties may be human and/or machine (e.g., communicating computers). The channel data 320 may include, for example, reliability history. The reliability history of a channel may be encoded, for example, in one or more fields (e.g., average time between failures, time since last failure, likelihood of failure in phone communication lasting longer than five minutes, likelihood of failure in email communication containing more than one megabyte of data) that are analyzed in connection with analyzing a channel. Such fields may be selected pursuant to one or more schema. The reliability may vary depending, for example, on time of day and location. By way of illustration, a cellular phone may have a first reliability when a call is placed after business hours from a fixed, known location while the same cellular phone may have a second reliability when a call is placed during business hours while traveling through an area known for interruptions in service (e.g., a highway tunnel).

The inferred data can include, but is not limited to, inferred channel data 350, inferred data 360 associated with a first communicating party and inferred data 370 associated with a second communicating party. Again, it is to be appreciated that communications involving a greater number of communicating parties can be analyzed by the present invention. It is to be appreciated that the channel manager 310 can be employed in connection with the system 100 (FIG. 1) as another embodiment of the subject invention.

Figure 4:
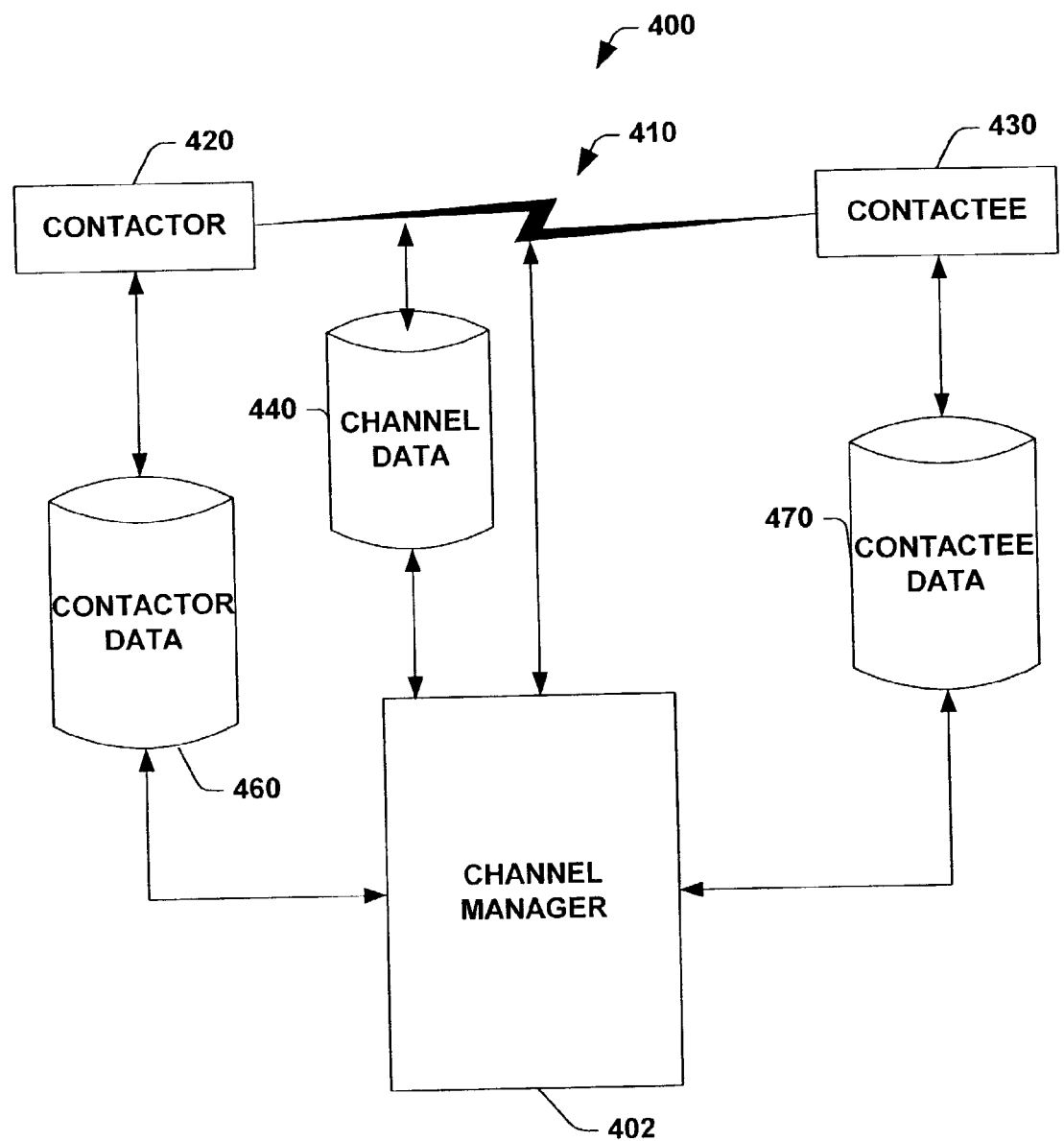
FIG. 4 is a schematic block diagram illustrating a system for identifying a communication channel that facilitates maximizing the utility of a communication based, at least in part, on the communication channel reliability, and the preferences, capabilities, contexts and goals of the parties to engage in the communication, in accordance with an aspect of the present invention.

Referring now to FIG. 4, a system 400 that includes a channel manager 402 is illustrated. The channel manager 402 identifies communication channels that facilitate optimizing the utility of a communication 410 between a contactor 420 and a contactee 1430. While one contactor 420 and one contactee 430 are illustrated, it is to be appreciated that the system 400 facilitates identifying optimal communication channels between two or more communicating parties (e.g., communication groups). It is to be further appreciated that the parties to the communication 410 may include human parties, apparatus and/or electronic processes. Thus, as employed herein, the terms contactee and contactor include groups of contactors and groups of contactees.

The communication 410 may be achieved through a variety of channels that exhibit a variety of reliabilities. The channels include, but are not limited to, telephone channels, computer channels, fax channels, paging channels and personal channels. The telephone channels include, but are not limited to POTS telephony, cellular telephony, satellite telephony and Internet telephony. The computer channels can include, but are not limited to email, collaborative editing, instant messaging, network meetings, calendaring and devices employed in home processing and/or networking. The personal channels include, but are not limited to videoconferencing, messengering and face-to-face meeting. Data concerning a current channel (e.g., a phone that is busy) can be analyzed, as can data concerning the likelihood that the channel may become available (e.g., phone will no longer be busy).

A channel manager 402 is employed to identify and determine which channels can be employed for the communication 410 between the contactor 420 and the contactee 430. To facilitate identifying the channels and their associated reliabilities, and to further facilitate determining which of the channels should be employed for the communication 410, and at what point in time the communication should be attempted, the channel manager 402 has access to a channel data store 440, a contactor data store 460 and a contactee data store 470. The contactor data store 460, the channel data store 440 and the contactee data store 470 can store data in data structures including, but not limited to one or more lists, arrays, tables, databases, stacks, heaps, linked lists and data cubes. The contactor data store 460, the channel data store 440 and the contactee data store 470 can reside on one physical device and/or may be distributed between two or more physical devices (e.g., disk drives, tape drives, memory units). Further, the contactor data store 460, the channel data store 440 and the contactee data store 470 may reside in one logical device and/or data structure. Similarly, the channel manager 402 can be distributed between two or more cooperating processes and/or reside in one physical or logical device (e.g., computer, process).

The contactor data store 460 and the contactee data store 470 may hold, for example, current state information, predictions concerning future states and costs associated with delaying a communication to points in time associated with the predictions concerning future states. Such costs may be related to (re)(dis)connecting processing undertaken if a channel degrades to the point that reconnecting is required. The contactee data store 470 may include information concerning the location of the contactee 430 (e.g., in a tunnel, underwater), the current attentional status of the contactee 430 (e.g., in conversation on the phone concerning an assigned task) and may also include information concerning predicted attentional states of the contactee 430 at one or more future points in time (e.g., 25% likelihood contactee 430 in same state in five minutes, 50% likelihood contactee 430 in lower attentional state in ten minutes). If a party is in a high attentional state, focused on a particular channel (e.g., computer), then that channel may have increased reliability while other channels may have reduced reliability.

The channel data store 440 may be populated, at least in part, by a reliability analyzer and/or a reliability integrator. While one communication 410 is illustrated, it is to be appreciated that one or more communication channels may be employed in methods including, but not limited to, parallel, serial and simultaneous communication between the contactor 420 and the contactee 430. By way of illustration, the contactor 420 and the contactee 430 may communicate by telephone at the same time that they are sharing a document via collaborative editing over a computer network communication channel. Additionally, and/or alternatively, if the predicted reliability of a first channel is below a pre-determined level (e.g., fifty percent), then a second "backup" channel to which the communication may be transferred may be acquired in anticipation of potential degradation.

The channel manager 402 may examine data (e.g., contactor data, channel data 470, contactee data) and find information sufficient to perform deterministic calculations for identifying the optimal channel for the communication 410. The deterministic calculations may be facilitated by applying one or more preference-based rules based on the sufficient information. By way of illustration, if a first party is attempting to telephone a second party, then the present invention may display the current best possible means, ranked by likelihood, of reliably reaching the second party at a desired cost and utility given the context of the second party. By way of further illustration, if a contactor listed in a contactee's people class store as a "critical colleague" tries to reach the contactee, the present invention may route that contactor to the most reliable voice enabled device regardless of cost, or to the contactee's proxy to maximize utility. Thus, reliability is considered alongside preferences and contexts in selecting channels and/or rules for selecting channels.

Additionally and/or alternatively, the present invention directs communications via automated methods that identify communication actions that have the highest value or highest expected value given uncertainties in variables under consideration. Several formulations of decision problems are feasible, depending on the variables under consideration, the preferences being represented, and the principal agent (or "owner") of the decision. Identifying the optimal communication channel can include considering the benefits of establishing the communication 410 at a first point in time, with the communication channels available at that point in time, and considering the costs of delaying establishing the communication 410 to a second point in time when other communication channels may be available. In a general formulation of the problem, the present invention considers a "communications value function", $f$, that returns a value for each communication channel or subset of channels under consideration or an ordering over communication channels in terms of acceptability of the channel or subset of channels.

Value(channel)=$f$(reliability of channel, preferences(contactee, contactor, organization), context(contactee, contactor))

where reliability of channel includes factors like mean time between failures, average failure duration, average signal degradation and the like. One example for the formula $f$ is:

Value(channel)=((reliability of channel*$wr1$)+(preferences(contactee, contactor,organization)*$wp1$)+ (context(contactee,contactor)*$wc1$))/($wr1+wp1+wc1$)

reliability of channel is the computed reliability of the channel, $wr1$ is a weight associated with the reliability, preferences(contactee, contactor, organization) is the utility based on the preferences of the parties, $wp1$ is a weight associated with the preferences, context(contactee, contactor) is the utility based on the context of the parties, and $wc1$ is a weight associated with the context.

It is to be appreciated that data associated with the reliability of the channel, the contexts and the preferences may be stored in one or more formats, including, but not limited to, an XML schema.

The channel manager 402 may discover that incomplete information is available. Thus, the channel manager 402 may be uncertain concerning certain data points involved in calculations for identifying the optimal channel for the communication 410. Thus, the channel manager 402 may be required to reason under this uncertainty. In one example aspect of the present invention, the channel manager 402 may require a value associated with the location of the contactee 430, which is employed to predict the reliability of a cellular telephone communication. But for one sample calculation, no such value may be found in the contactee data store 470. Thus, the channel manager 402 may rely on one or more conditional probabilities associated with the contactee 430 location based on information like time of day, day of the week and current task.

In general, there may be uncertainty concerning communication channels, preferences and one or more parameters employed to model a context. In this situation, a probability distribution over the different states of each variable can be inferred and expected values for each channel can be computed. By way of illustration, if there is uncertainty concerning aspects of the reliability of the communication channel, the probability distribution (here represented abstractly), given evidence E observed about the channel, can be represented:

Expected value(Channel)=$\Sigma_i f(p(\text{channel}_1 \text{ reliability}|E),$
preferences(contactee, contactor, organization), context (contactee, contactor))

Similarly, if there is uncertainty concerning aspects of the context of the contactee, the probability distribution given additional evidence E' observed about the context, can be represented:

Expected value(Channel)=$\Sigma_j \Sigma_i f(p(\text{channel}_1 \text{ reliability}|E),$ preferences(contactee, contactor, organization), p(context j of contactee|E'), context of contactor)

The present invention may order the channels by assigned expected value and attempt to create a connection or to advise the contactor and/or contactee concerning the best connection. While this expected value can be employed to initially identify the channel that is predicted to maximize the utility of the communication 410, in one example of the present invention the contactee 430 will be presented with options concerning the communication. The contactee 430 reaction to the options will then determine the channel that is selected for the communication 410. The reactions to the options can be employed in machine learning that facilitates adapting the channel manager 402.

Considering now more specific examples of the use of expected utility before reliability has been factored in, a particular basic formulation of decision-making under uncertainty in the context of the preferences of the contactee 430 is captured by Equation 1:

$$A^* = \arg\max_j \sum_i p(\text{context}^R i | E) \times \qquad \text{(Equation 1)}$$

$$u(A_j, A_k^C, C, \text{context}^R i, \text{context}^C)$$

where A* is the ideal communication actions, which include the channels employed by the contactor ($A^{C*}$) and contactee (Recipient)($A^{R*}$) computed by optimizing Equation 1. In equation 1, $A_j$ is the communication channel being considered $A^C_k$ is the communication channel employed by the contactor, context$^R$, is the context of the contactee (Recipient) of the intended communication, context$^C$ is the context of the contactor, and C is the identity of the contactor, typically linked to a class of person (e.g., critical associate, previously replied to, family, unknown).

Thus, in an example aspect of the present invention, the conditional probability p(context$^R_1$|E) that the contactee 430 has a certain context given the evidence E is employed in conjunction with the utility function u to determine the ideal communication actions that can be taken to maximize the utility of the communication 410 between the contactor 420 and the contactee 430.

Considering the use of expected utility where the reliability of a channel is analyzed leads to Equation 1'.

$$A^* = \arg\max_j \sum_i p(\text{reliability} A_i^C | E) \times \qquad \text{(Equation 1')}$$

$$u(A_j, A_i^C, C, \text{context}^R, \text{context}^C)$$

Thus, in an example aspect of the present invention, the conditional probability p(reliabilityA$^C_1$|E) that the channel has a certain reliability given the evidence E is employed to maximize the utility of the communication 410.

The basic formulation for identifying optimal communication channels can be extended by introducing uncertainty about the context of the contactor 420, which adds the summing noted in equation 2 to the uncertainty calculations of equation 1. The particular communication action and/or channel selected for the initial contact by the contactor 420 is represented as $A^C_{init}$ $$A^* = \operatorname*{argmax}_{j} \sum_i \sum_k p(\text{context}^R i \mid E) p(\text{context}^C k \mid E) \times \qquad \text{(Equation 2)}$$
$$u(A_j, A^C_{init}, C, \text{context}^R i, \text{context}^C k)$$

Similarly, equation 2 can be extended by introducing uncertainty about reliability, which leads to equation 2'.

$$A^* = \operatorname*{argmax}_{j} \sum_i \sum_k \sum_s p(\text{context}^R i \mid E) p(\text{context}^C k \mid E) p(\text{reliability}_s \mid E) \times u(Aj, A^C_{init}, \text{context}^R i, \text{context}^C k) \qquad \text{(Equation 2')}$$

The contactor 420 and contactee 430 contexts represent rich sets of deterministic or uncertain variables. Data associated with automated assessments and/or directly marked indications of urgency or importance in the communications can also be evaluated in identifying optimal communication channels. The contextual variables can be treated as explicit deterministic or probabilistic factors in the optimization. For example, $m^c_k$ can represent the channels available to the contactor 420 and thus equation 3 considers combinations of channels available to the contactor 420.

$$A^* = \operatorname*{argmax}_{l,n,k} \sum_i \sum_k \sum_s p(\text{context}^R i \mid E) p(\text{context}^C k \mid E) p(\text{reliability}_s \mid E) \times \qquad \text{(Equation 3)}$$
$$u(A(m^R_l, m^C_n), A^c_{init}, \text{context}^R i, \text{context}^C k)$$

Thus, the system 400 can, in various example aspects, account for the preferences, contexts and capabilities of the contactor 420 and/or the contactee 430 and the reliability of a channel where information concerning the contexts may be incomplete, thus requiring reasoning under uncertainty to identify the likely optimal communication channel.

The present invention can also compare the best communication option available now with the best communication option that will be available later, and update the value of the communication for the losses based in delays in communication, and potential gains or losses based on changes in disruptiveness if the communication should come at the later time t when the contactee is in a different state (e.g., more available or less available). Such comparison can be captured by equation four:

Thus, decision-theoretic formulae like those described in equations 1 through 4 are employed to produce one or more expected utilities for one or more sets of contactors and/or contactees. In one example aspect of the present invention, a communication is automatically initiated, scheduled and/or calendared based on such information. But in another aspect of the present invention, information concerning those expected utilities is presented to one or more parties. By way of illustration, a contactor 420 is presented with a list of communications with high utilities determined in accordance with the preferences of the contactee. The contactor 420 then selects from the list.

While one communication 410 between one contactor 420 and one contactee 430 is illustrated, it is to be appreciated that a greater number of communications between a similar or greater number of contactors 410 and/or contactees 420 can be identified by the present invention. By way of illustration, multiple communications 410 between two communicating parties can be identified by the system 400 (e.g., duplicate messages sent simultaneously by email and pager).

Figure 5:
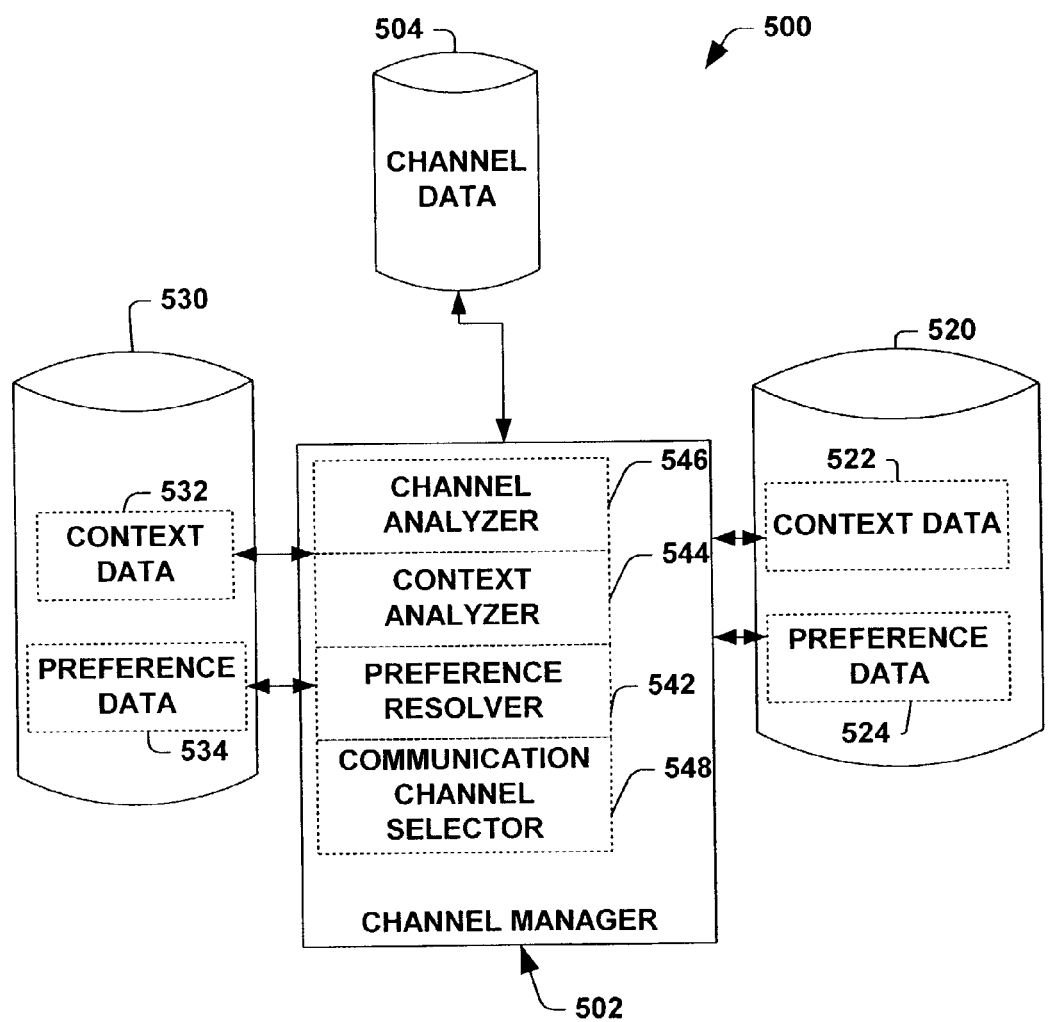
FIG. 5 is a schematic block diagram illustrating a system for identifying a communication channel that facilitates maximizing the utility of a communication based, at least in part, on the communication channel reliability and the preferences, capabilities, contexts and goals of the parties to engage in the communication, in accordance with an aspect of the present invention.

Referring now to FIG. 5, a system 500 for identifying optimal communications based on the predicted reliability of a communication channel and the preferences and context of the parties engaged in a communication is illustrated. The communication that is identified by a channel manager 502 may depend, at least in part, on one or more sets of data concerning communication channels, channel reliabilities, contactors and/or contactees, for example. One possible data set, a communication channel data set 504 concerns the available communication channels and associated predicted reliabilities. The available communication channels can include, but are not limited to email (of various priorities), telephone (POTS, cellular, satellite, Internet), paging, runners/couriers, video conferencing, face-to-face meeting, instantaneous collaborative editing, delayed posting col- $$\text{Value}A^{*'}(t_+) - \text{Value}A^*(t_0) = \qquad (4)$$
$$\max_{l,n} \sum_i \sum_k p(\text{context}^R i \mid E, t_+) p(\text{context}^C k \mid E, t_+) \times u(A(m^R_l(t_+), m^C_n(t_+)),$$
$$A^C_{init}, C, \text{context}^R i(t_+), \text{context}^C k(t_+)) -$$
$$\max_{l,n} \sum_i \sum_k p(\text{context}^R i \mid E, t_0) p(\text{context}^C k \mid E, t_0) \times$$
$$u(A(m^R_l(t_0), m^C_n(t_0)), A^C_{init}, C, \text{context}^R i(t_0), \text{context}^C k(t_0))$$

laborative editing, picture in picture television, home device activation (e.g., turning on lights in the study, ringing the telephone with a distinctive pattern) and so on. A communication channel may not be a static entity, and thus information concerning the reliability, state, capacity, availability, cost etc., of communication channels can change. Thus, the communication channel data set 504 can contain current reliability and state information and/or data to facilitate making predictions concerning future reliability, state, capacity, availability, cost etc. associated with one or more communication channels. The communication channel data set 504 may be populated by a reliability predictor and/or reliability prediction integrator, for example.

The location of a contactee can determine which communication channels, if any, are available. For example, a programmer may have collaborative editing, phone, email, pager, video conferencing and face-to-face communications available at her office, may have phone, face-to-face and email available while in her home office, may only have satellite phone available while on vacation and may have no real-time capacity while in the shower or asleep. The current task of the contactee can also determine which communication channels, if any, are available and most reliable. For example, if the programmer is currently on the phone, then the phone may not be available. Predictions concerning the likelihood that the phone will become available can be employed by the system 500 in determining the optimal channel for the communication. Thus, rather than sending an email at a first point in time (e.g., while the phone is busy and the email may be ignored, making the email less reliable), the present invention may schedule a real-time phone call at a second, later point in time, when it is likely that the programmer will be off the phone, and attentive to another phone call, making that telephone communication more reliable.

The channel manager 502 may also have available another set of data referred to as the contactee data 520. The contactee data 520 may include information related to hardware, software, contactee task being performed, contactee attention status, contactee context data 522 and contactee preference data 524, for example. By way of illustration, the hardware data may include information related to what hardware is available to the contactee, what hardware is being employed by the contactee (e.g., desktop, laptop, PDA), reliability history of that hardware, the capabilities of that hardware (e.g., enough memory and communication bandwidth for videoconferencing), the cost of employing that hardware and the state(s) in which that hardware is currently functioning (e.g., online, offline). The hardware data may also include information concerning usage patterns that facilitate determining the likelihood that an unavailable piece of hardware will become available and the likelihood that an initially reliable piece of hardware (e.g., fully charged laptop) may become unreliable (e.g., battery runs low).

The software data may include information related to what software is available to the contactee, the reliability history of that software, what software is currently being employed by the contactee (e.g., which word processor is being used to edit the speech), the capabilities of that software (e.g., allows collaborative editing) and the state(s) in which that software is currently functioning (e.g., running and active, running but inactive). The software data may also include information concerning usage patterns that facilitate determining the likelihood that an unavailable piece of software will become available and that an initially reliable piece of software (e.g., single browser session) may become less reliable (e.g., one hundred concurrent browser sessions run on the same laptop computer).

The contactee data 520 may also contain preference data 524 concerning the preferences of the contactee. The preference data 524 can include data concerning how the contactee prefers to be contacted, including desired reliability, with those preferences varying over time with respect to various contactors and various topics of communication. For example, the programmer may initially allow communications from a large group of persons concerning a project. The programmer may also establish preferences that allow her supervisor to communicate with her with a best effort at real-time telephony at all times up to the deadline for delivering the project. But the programmer may gradually restrict the group of people from whom she is willing to accept real-time communications as the deadline approaches and she may further restrict the means by which such people can communicate. In the last days before the deadline, the programmer may be closed to all real-time communications except in person communications with her supervisor and telephone based emergency medical information concerning family members, for example.

The contactee preference data 524 can include data concerning, but not limited to, the desired level of reliability for certain communications, preferences concerning the time of day for communicating (e.g., early morning, business hours, evening, late night, sleeping hours), the time of the week for communicating (e.g., Monday through Friday, Weekend, Holiday, Vacation), identity of contactors (e.g., employer, employees, critical colleague, colleague, peers, nuclear family, extended family, close friends, friends, acquaintances, others), hardware currently available or available within a time horizon of a communication attempt (e.g., desktop, laptop, home computer), software (e.g., email, word processing, calendaring) and interruptability (e.g., do not interrupt while focused on work, only interrupt while not focused), for example. While six preferences are identified in the preceding sentence, it is to be appreciated that a greater or lesser number of preferences may be employed in accordance with the present invention.

The contactee data 520 may also include a context data 522. The context data 522 is generally related to observations about the contactee. For example, observations concerning the type of activity in which the contactee is involved (e.g., on task, not on task), location of the contactee (e.g., office, home, car, shower), calendar (e.g., appointment status, appointment availability), history of communications with other party (e.g., have replied to email in the past, have spoken to on the telephone recently, the utility of the interaction, the duration of the interaction), background ambient noise at current location, number of hours at work that day and attentional status (e.g., high focus, focus, light focus, conversation with another person, light activity) may be stored in the context data 522. Such context data may affect the reliability of a communication. For example, as the hours worked by a contactee increases beyond certain thresholds (e.g., 10 hours, 15 hours, 20 hours) the reliability of any communication with that contactee may suffer. While seven observations are listed in the preceding sentence it is to be appreciated that a greater or lesser number of observations may be stored in the context data 522.

On some occasions the context data 522 may be incomplete (e.g., video analysis data unavailable because video camera broken). Thus, the channel manager 502 may need to reason concerning the optimal communication while relying on such incomplete data. Thus, the contactee data 520 may also include information to facilitate producing one or more probabilities associated with a missing data element. By way of illustration, the contactee data 520 may contain information operable to predict the likelihood that the contactee is in a high attentional state even though gaze tracking information is unavailable.

The contactee data 520 may further include information concerning the long-term and/or acute, dynamically changing communication needs of the contactee. By way of illustration, the contactee may need to hear from a certain colleague via the most reliable means possible within the next twenty-four hours. By way of further illustration, to prevent a contactor from intentionally under communicating (e.g., leaving an insecure email) when the contactee desires a secure voice communication, the contactee may require that contacts from the contactor be made in a certain way within X units of time of notification that the contactor desires communication.

Thus, returning to equation 1, (Equation 1)

$$A^* = \underset{j}{\mathrm{argmax}} \sum_i p(\mathrm{context}^R i \mid E) \times u(A_j, A_k^C, C, \mathrm{context}^R i, \mathrm{context}^C)$$

the contactee data 520 is seen to contribute to the utility function u through the $\mathrm{context}^R$, component, which can include the contactee context data 522 discussed above.

In addition to the contactee data 520 employed in determining the optimal communication, data concerning the contactor 420 may also be employed. The contactor data 530 can include hardware, software, context, preference and communication needs data substantially similar to that available for the contactee 430, but different in that it is prepared from the point of view of the contactor 420.

Thus, returning again to equation 1, (Equation 1)

$$A^* = \underset{j}{\mathrm{argmax}} \sum_i p(\mathrm{context}^R i \mid E) \times u(A_j, A_k^C, C, \mathrm{context}^R i, \mathrm{context}^C)$$

the contactor data 530 is seen to contribute to the utility function u through the $\mathrm{context}^C$ component.

In addition to the contactee data 520 employed in determining the optimal communication, data concerning the contactor may also be employed. The contactor data 530 may include hardware, software, context data 532, preference data 534 and communication needs data similar to that available for the contactee, but different in that it is prepared from the point of view of the contactor.

The present invention is not limited to communications between two parties or to a single communication channel between two parties. It is to be appreciated that multiple channels and/or multiple communicating parties can be treated as increased sets of alternatives that may complicate utility maximizing computations without changing the fundamental process of identifying and establishing one or more communications based on the reliability, preferences, contexts and capabilities of the communicating parties.

The channel manager 502 may include several computer components responsible for performing portions of the functionality of the channel manager 502. For example, the channel manager 502 may include a preference resolver 542.

The preference resolver 542 can examine the contactee preference data 524 and the contactor preference data 534 to find correlations between the two sets of data. In one example of the present invention, information concerning the correlations is stored in a resolved preference data. For group communications, the preference resolver 542 may examine multiple sets of preference data to find correlations between the preferences.

By way of illustration, for a communication between two parties, the preference resolver 542 may determine that both parties would prefer to communicate at a high level of reliability for communications associated with a first task. Similarly, the preference resolver 542 may determine that the contactee would prefer to communicate by collaborative editing and phone for communications concerning a particular document, while the contactor would prefer to communicate only by telephone. Thus, the preference resolver 542 may produce data or initiate processing that assigns values to the correlations between the contactee preferences and the contactor preferences. In one example aspect of the present invention, the preferences of the contactee are given more weight, and thus, if the contactor attempted a communication at a lower level of reliability than preferred concerning the document about which the contactee desired to communicate, then the preference resolver 542 may produce data or initiate processing that would make it more likely that the contactor would communicate by a more reliable channel.

In another example aspect of the present invention, the preferences of the contactor are given priority over the preferences of the contactee. By way of illustration, when a human contactor is attempting to communicate with an electronic contactee, the preferences of the contactor may be considered more important, and thus the preference resolver 542 may produce values or initiate processing that makes it more likely that the preferences of the contactor are observed. In another example aspect of the present invention, the preference resolver 542 may produce a list of potential communication channels ranked on their responsiveness to the preferences.

The channel manager 502 may also include a context analyzer 544. The context analyzer 544 can examine the contactee context data 522 and the contactor context data 532 to find correlations between the two sets of data. In one example of the present invention, information concerning the correlations is stored in an analyzed context data. For group communications, the context analyzer 544 may examine multiple sets of context data to extract information concerning the contexts. By way of illustration, for a communication between two parties, the context analyzer 544 may determine that the contactee context is such that reliable real-time communications are not immediately available but there is an $X_1$% likelihood that communications with a desired reliability level will be available at a point of time $T_1$ in the future, and an $X_2$% likelihood that such communications will be available at a point of time $T_2$ in the future. Further, the context analyzer 544 may determine that although the contactor has requested real-time telephony, the context of the contactor is such that email communication may optimize utility (e.g., 128 bit, public/private key encryption). For example, the context of the contactor may include information concerning the computer security of the contactor (e.g., dialed in to a public service provider on an insecure server). The context analyzer 544 may determine that the network security level is not conducive to optimizing utility by unencrypted email (e.g., too easy to hack) and thus may produce values and/or initiate processing that will make it more likely that the contactor will be required to encrypt the message. Similar to processing performed by the preference resolver 542, the context analyzer 544 may, in different examples of the system 500, weight the context of the contactee more than the context of the contactor or vice versa.

Returning again to equation 1, (Equation 1)

$$A^* = \operatorname*{argmax}_j \sum_i p(\text{context}^R i \mid E) \times$$
$$u(A_j, A_k^C, C, \text{context}^R i, \text{context}^C)$$

the context analyzer 544 performs processing associated with the utility function u and its analysis of the $\text{context}^R$, and the $\text{context}^C$.

The channel manager 502 may also include a channel analyzer 546. The channel analyzer 546 is employed to analyze information received from a reliability integrator, for example. The channel analyzer 546 produces data concerning the current availability of a communication channel and/or the likelihood of the channel becoming available. In one example of the present invention, such data is stored in a communication channel data. The channel analyzer 546 also examines one or more channels that the contactor 420 specified for the communication, and/or one or more channels that the contactee 430 listed as preferences in the contactee preference data 524, for example. The channel analyzer 546 also examines currently available channels as determined by location information associated with the contactee 430 and channels that may become available based on the activity of the contactee 430. For example, if the contactee 430 is currently driving home (as determined by GPS and schedule, for example), then the channel analyzer 546 examines current cellular channels and additionally examines the channels available at the home of the contactee 430. Thus, the channel analyzer 546 facilitates producing data and/or initiating processing that makes it more likely that a desired channel is employed when determining the optimal communication channel(s) for the communication 410 between the contactor 420 and the contactee 430. Thus, examining equation 1, $$A^* = \operatorname*{argmax}_j \sum_i p(\text{context}^R i \mid E) \times$$ (Equation 1)
$$u(A_j, A_k^C, C, \text{context}^R i, \text{context}^C)$$

the channel analyzer 1476 performs processing associated with the utility function u and its analysis of the contactor channels $A_j$ and the contactee channels $A^C_k$.

The channel manager 502 may also include a communication channel selector 548. Once the ideal communication actions A* have been identified, the communication channel selector 548 may undertake processing to connect the contactor and the contactee through the identified optimal communication channel(s). For example, if the optimal communication channel is identified as being 128 bit, public/private key encrypted email, then the communication channel selector 548 may initiate an email composing process for the contactor (e.g., email screen on computer, voice to email converter on cell phone, email composer on two-way digital pager), and forward the composed email to the most appropriate email application for the contactee based on the identified optimal communication channel. For example, the communication channel selector 548 may forward the email through the most secure channel(s) possible based on routing tables available to the contactor hardware and software. In an alternative embodiment of the present invention, the system 500 does not include a communication channel selector 548, relying instead on contactor and/or contactee actions, for example, to establish the communication.

It is to be appreciated that the preference resolver 542, the context analyzer 544, the channel analyzer 546 and the communication channel selector 548 are computer components as the term is defined herein.

Figure 6:
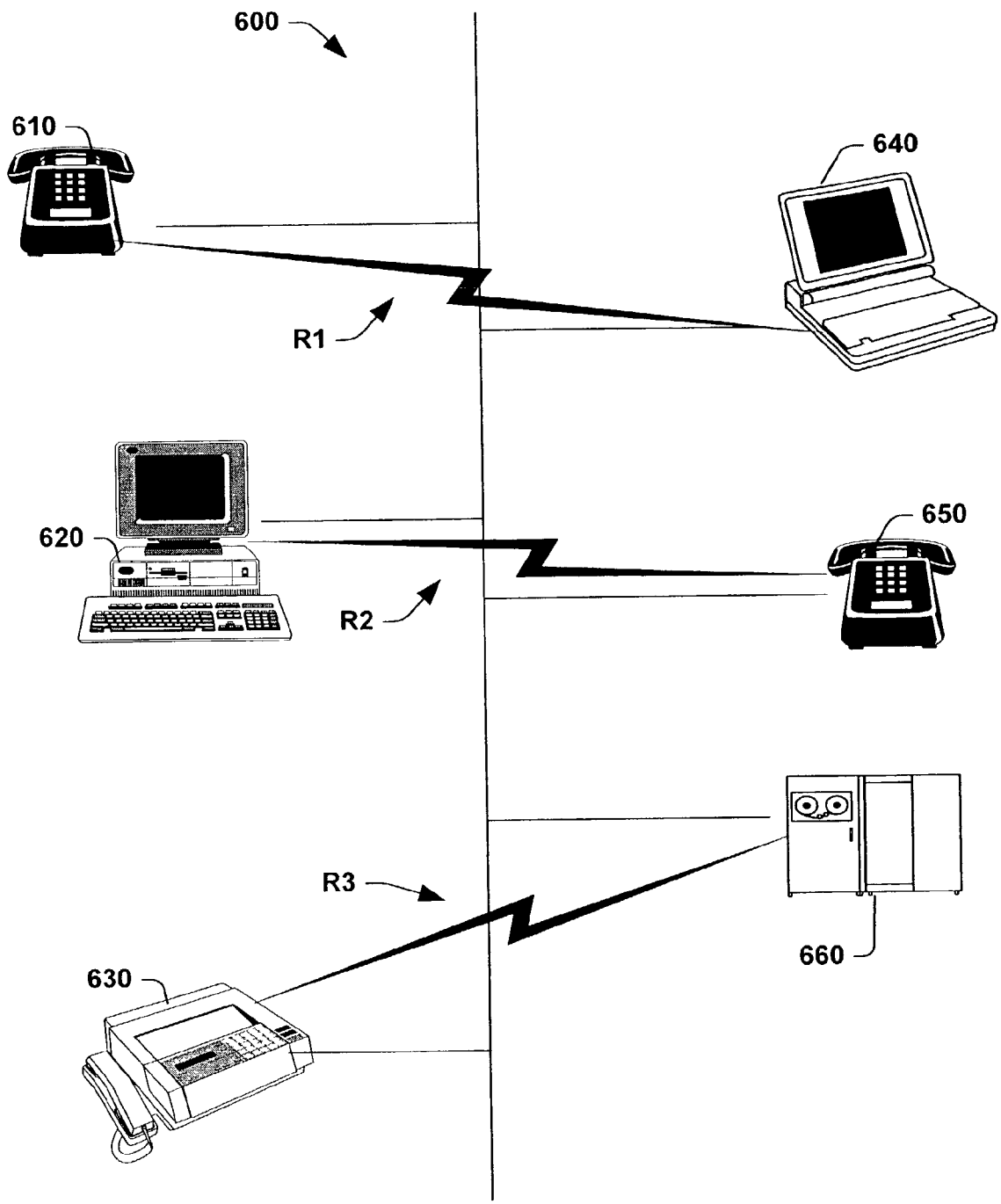
FIG. 6 illustrates three different predicted reliabilities associated with three possible communications, in accordance with an aspect of the present invention.

FIG. 6 illustrates an environment 600 in which the present invention may be employed. The environment 600 may include a plurality of communication devices, some of which are available to one or more contactors and some of which are available to one or more contactees. For example, the left side of FIG. 6 may represent communication devices associated with a contactor and the right side of FIG. 6 may represent communication devices associated with a contactee. The contactor may have, for example, a phone 610, a desktop system 620 and a fax 630. The contactee may have, for example, a laptop 640, a phone 650, and a mainframe system 660. Such devices may be able to achieve communications exhibiting varying levels of reliability where such levels can vary with respect to time and context.

FIG. 6 also illustrates three predicted reliabilities (R1, R2, R3) that may be predicted for three different communications. For example, the predicted reliability R1 between the phone 610 and laptop 640 may be affected by the current load on the phone system, the distance of the call, and the battery status of the laptop. Similarly, the predicted reliability R2 of the communication between the desktop system 620 and the phone 650 may be affected by Internet traffic. Furthermore, the predicted reliability R3 may be affected by factors like atmospheric conditions and the presence of RF (radio frequency) interference. Thus, although the communicating parties may have established preferences that would initially lead a channel managing system to select a first communication (e.g., phone 610 to laptop 640), the predicted reliability R1 may be such that a second communication (e.g., system 620 to phone 650) may be chosen due to a much higher predicted reliability R2.

The contactee may have established preferences that indicate that for communications from a first group of contactors (e.g., known political malcontents) the contactee would prefer email and that the least reliable means are acceptable. Similarly, the contactee may have established preferences that indicate that for communications from a second group of contactors (e.g., known top campaign contributors) the contactee would prefer real-time phone communications via the most reliable telephone available at the time. By way of further illustration, the contactee may have established preferences that indicate that for communications from a third group of contactors (e.g., collaborating legislative authors) that the contactee would prefer both a real-time phone call and a shared computer screen displaying the document at a point concerning which the contactor wishes to communicate, where the collaborative editing session has a desired level of security to frustrate hackers.

Given this set of preferences, communications attempted from a contactor may take a different form than the contactor would prefer. But since the attention of the contactee is the resource that is being accessed, for certain groups that resource will be sparely provided, while for other groups it will be generously provided, depending on the preferences of the contactee and the identity of the contactor.

The preferences of the contactee are not the only data points that are evaluated by the present invention when identifying the optimal communication channel for establishing a communication between the contactor and the contactee. For example, although the contactee may prefer an encrypted email from a collaborating programmer concerning a new compression algorithm, the collaborating programmer may not have available the public key required to encrypt the case. Thus, the programmer who desires to contact the contactee may be informed by the present invention, after it analyzes the preferences and the capabilities of the parties, of the public key and may be presented with an encrypted email dialog.

The preferences and potential communication channel reliability of the contactee may depend on where the contactee is located. Similarly, the capabilities of the contactee may depend on where the contactee is located. By way of illustration, at the office, the contactee may have Ethernet access to a virtual private network hosted on secure, mirrored servers. But at home the contactee may only have 56K dial up access via a public, load-affected, insecure network. Thus, while at work, the most reliable channel for communicating with the contactee may be via the virtual private network, while at home, the most reliable means may be via telephone. Thus, the present invention is able to examine the context of the contactee, which includes the location of the contactee, to determine capabilities.

A channel manager may also consider the value of delaying a communication and rescheduling it for a later time. Thus, the channel manager may scan channel schedules (e.g., rolling brownouts, planned network maintenance time, load predictions), party schedules (e.g., online calendars) and inferred availability information, or may establish private dialogs with potential participants to determine whether instant communication is required or whether a subsequently scheduled communication is acceptable. For example, a tornado warning must be distributed as soon as possible, preferably by every possible communication means, regardless of reliability, while the scores of the test match between Great Britain and Bermuda may be delayed until a time when the utility, based on cost/value and other factors, may be maximized.

The present invention includes methods for predicting the likelihood of when communication channels may be available, where such likelihoods can be employed in scheduling group meetings where the utility of the group experience of the n participants, n being an integer, is maximized. For example, schedules for communication channels and calendars for participants can be examined to determine and/or infer times at which the participants are likely to be available to share in suitably reliable channels. In other cases, there may be automated analysis about the best way to engage in a group meeting when a subset of participants will not have access to channels with preferred reliabilities. In such situations, a decision may be made to exclude some members and/or to restrict the subject matter of the communications for example.

In view of the exemplary systems shown and described above, methodologies that may be implemented in accordance with the present invention will be better appreciated with reference to the flow diagrams of FIGS. 7 through 11. While for purposes of simplicity of explanation, the illustrated methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement a methodology in accordance with the present invention. Furthermore, additional and/or alternative methodologies may employ additional blocks, not illustrated herein. Where the methodologies can be programmed into a series of computer executable instructions, such instructions may be available on a computer readable medium.

Figure 7:
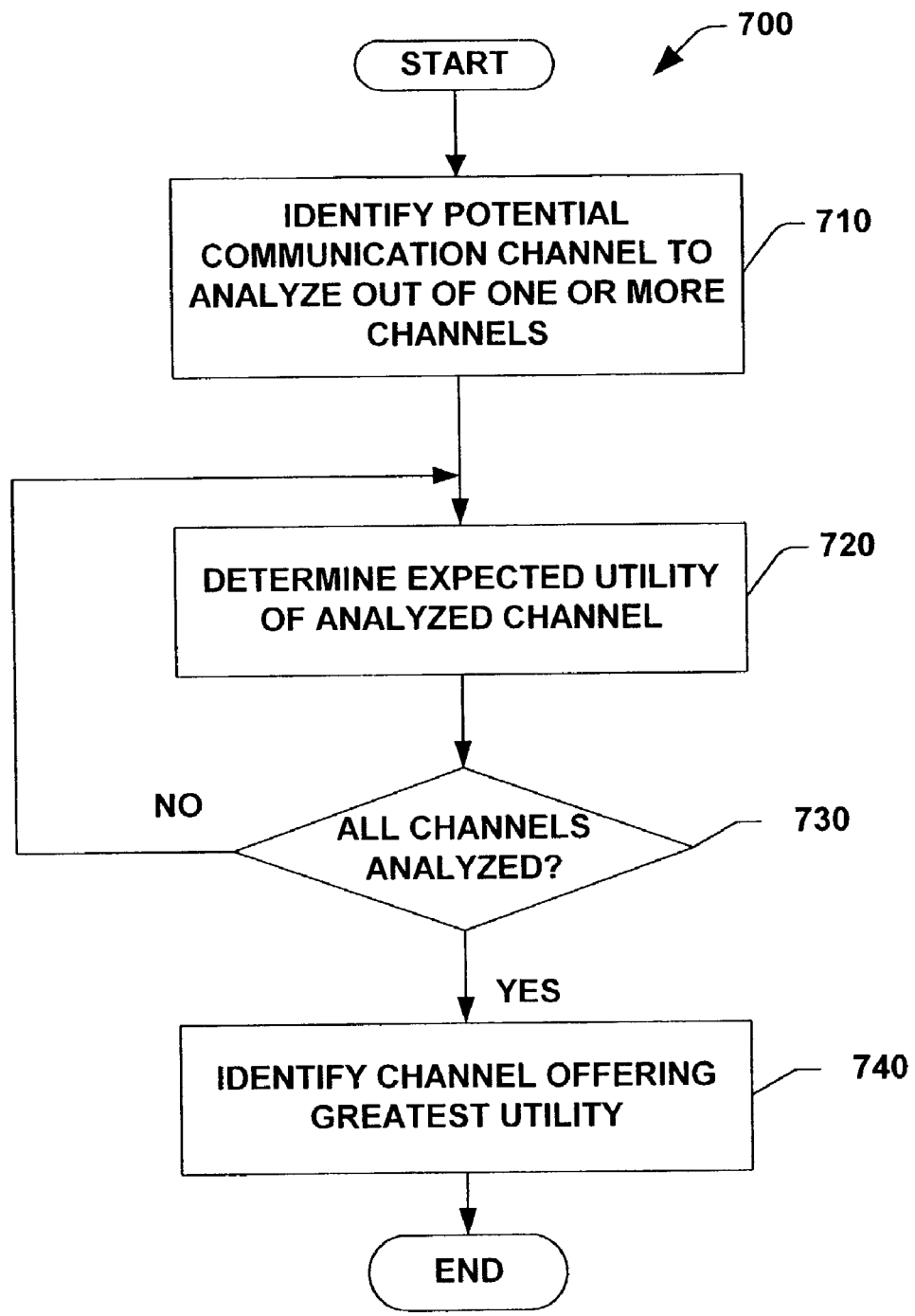
FIG. 7 is a flow chart illustrating one particular methodology for carrying out an aspect of the present invention.

FIG. 7 illustrates a method 700 for determining the expected utility of a communication and for selecting a channel based on the highest expected utility. At 710, a potential communication channel is identified from one or more available communication channels. The potential communication channel may be currently available and/or it may be available at one or more points of time in the future. At 720, the expected utility of a communication via the potential communication channel is computed. Such utility may depend, for example, on the reliability of the channel, and the context and preferences of the communicating parties. At 730, a decision is made concerning whether all the available channels have been analyzed. If the determination at 730 is NO, then processing can return to 720, otherwise processing can proceed to 740. At 740, based on the expected utilities determined at 720, the channel with the greatest expected utility can be identified, and, in one example of the present invention, a communication via that channel can be commenced.

A channel manager performing the method 700 can consider the optimization of a measure of priority or value from various points of view. For example, if the attentional resources of the contactee are considered of higher value than the attentional resources of the contactor, then the channel manager may weigh the preferences of the contactee more heavily. Alternatively and/or additionally, one or more policies may be established according to the policies of an organization that in addition to considering the preferences of contactees and contactors consider the preferences of the organization.

Thus, a method employed by the channel manager considers whether the selected communication satisfies a set of polices specified primarily by the contactee(s) and secondarily that of the contactor(s) concerning communications, where such preferences are considered in connection with the predicted reliability of the available communication channels. In a general formulation of this method, given communication channel reliabilities, communication and collaboration preferences expressed as utility functions, beliefs about context, content and communications expressed as probability distributions, and a set of decision alternatives concerning communications, the channel manager will identify the course(s) of action that maximize the expected utility of the communication.

Figure 8:
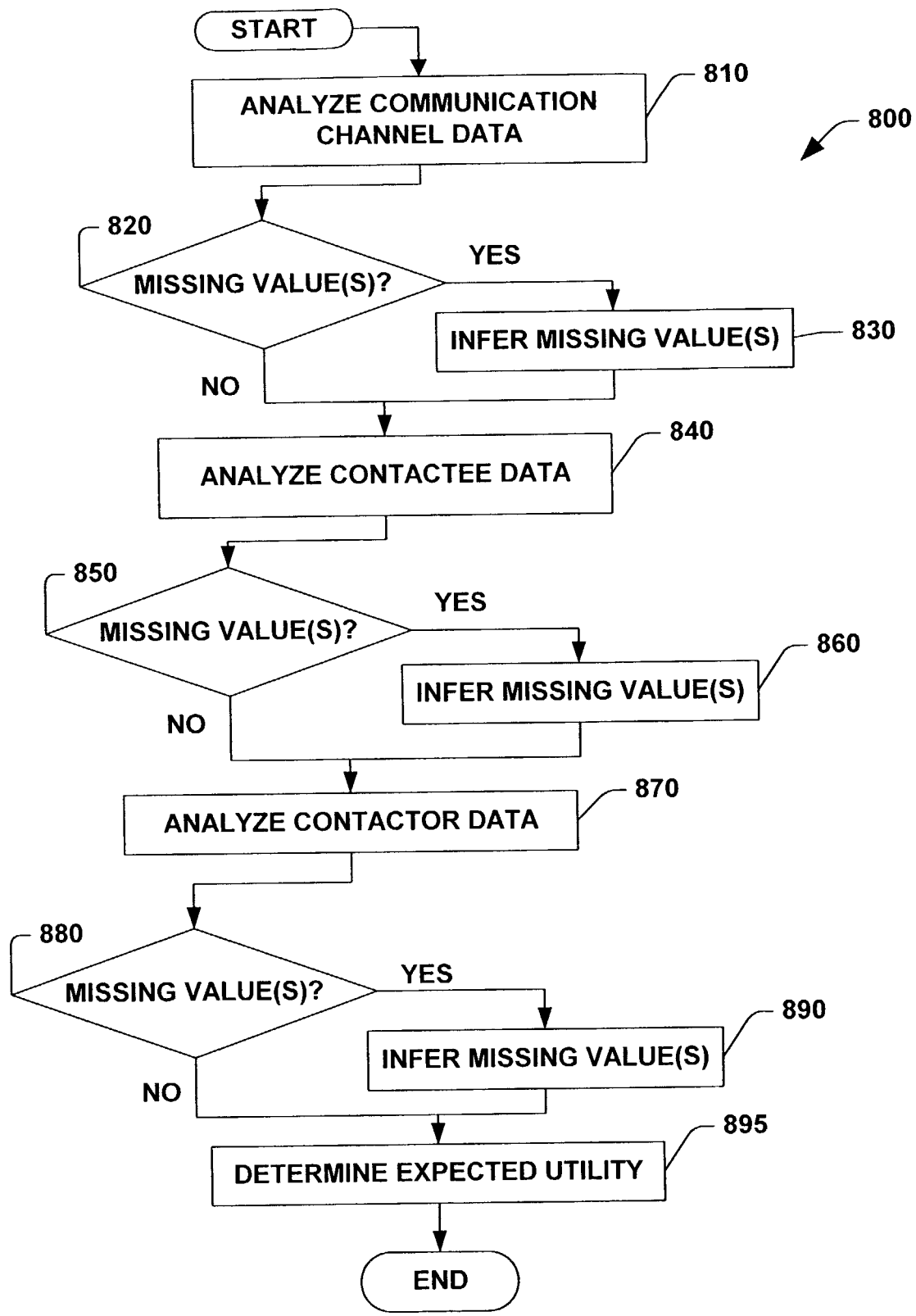
FIG. 8 is a flow chart illustrating another methodology for carrying out an aspect of the present invention.

FIG. 8 illustrates a method 800 for determining the expected utility of a communication via a communication channel where values are inferred for missing data points. A rich set of data concerning the communication channel, the contactee(s) and/or contactor(s) can be employed by the present invention to facilitate determining the communication channel that will maximize the utility of the communication, accounting for the reliability of the channel. Sometimes the present invention may reason concerning the optimal communication channel with complete data, but at other times, since the set of data is large and complex, the present invention may reason concerning the decision under uncertainty. For example, the decision-making system may only have a belief, represented as a probability distribution, concerning the likelihood that a communication channel will have a certain reliability. Such a belief may be computed dynamically as a function of information from sources including, but not limited to, the reliability history of the communication channel, the context of the communication devices/channels, the context of the communicating parties, status information gathered from the communication devices/channels and external context data (e.g., atmospherics, power outages, load). Inferred likelihoods about channel reliability may be employed to drive dynamic decision making about communications, motivated by an attempt to select actions that maximize the contactee's expected utility.

Thus, at 810, communication channel data is analyzed. Such communication channel data can include, but is not limited to, the reliability history of the communication channel, the reliability history of a current communication, a communication length, a communication type, the mean time between failure of the communication channel, the average failure duration of the communication channel, the average percent degradation of the communication channel, atmospheric conditions associated with the communication channel, scheduled communication channel maintenance and scheduled communication channel downtime.

At 820, a determination is made concerning whether any communication channel data values are missing. If the determination at 820 is YES, then at 830 processing may be undertaken to infer the missing values. For example, if no communication type is specified, and the communication is between an air traffic controller and a pilot, then an inference may be made concerning the communication type (e.g., air traffic control instruction).

At 840, contactee data is analyzed. The contactee data can include, but is not limited to, context data and preference data. At 850, a determination is made concerning whether any contactee data values are missing. If the determination at 850 is YES, then at 860 processing may be performed to infer the missing values. For example, if the location of the contactee is not determined, then an inference may be made based on the day of the week and the time of day (e.g., Monday morning, 9:30 a.m., programmer likely in office).

At 870, contactor data is analyzed. The contactor data can include, but is not limited to, context data and preference data. At 880 a determination is made concerning whether any contactor data values are missing. If the determination at 880 is YES, then at 890, one or more inferences may be made concerning the contactor data. By way of illustration, if the communication length is not known then the identity of the contactor may be employed to determine the predicted communication length based, for example, on the historical average length of communications from the contactor. At 895, the determined and inferred data values are analyzed to produce the determined expected utility of the communication.

Figure 9:
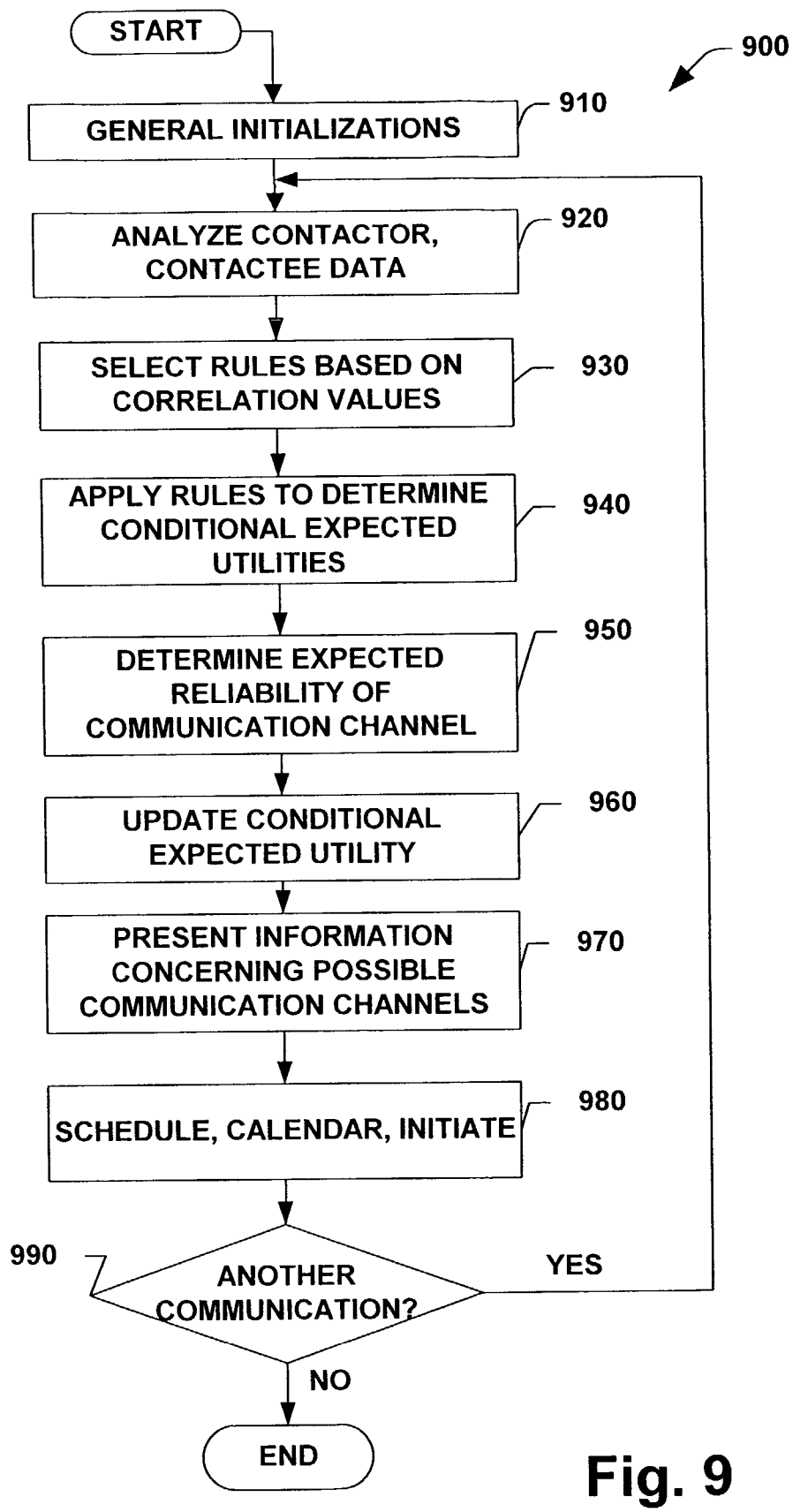
FIG. 9 is a flow chart illustrating another methodology for carrying out an aspect of the present invention.

Turning now to FIG. 9, a flow chart illustrates a method 900 for identifying an optimal communication channel between two or more communicating parties where the reliability of the communication channel(s) along which the communication(s) will travel is considered as a determining factor. At 910, general initializations occur. Such initializations can include, but are not limited to, identifying potential communication channels, allocating memory, establishing pointers, establishing data communications, acquiring resources, setting variables and displaying process activity.

At 920, data including, but not limited to, contactor data and contactee data is analyzed. The contactor data and the contactee data can include, but is not limited to, context data and preference data. The context data can include observed data, (e.g., data gathered by watching the party and or observing the environment of the party). The context data can include, but is not limited to application data (e.g., which applications are being employed), user data (e.g., the identity of the party) and party capability data (e.g., hearing challenged, sight challenged, typing challenged). Such context data may affect the reliability of a channel. By way of illustration, if the context indicates that a party is in an area where there is a high amount of RF (radio frequency) interference, then the reliability of radio and/or cellular communications may be downgraded, leading to a preference for land line communications.

The preference data refers to how the party would like the communication to be achieved. The preference data includes, but is not limited to, desired reliability level, time data, location data, task data, goal data and communication needs data. In addition to the contactor and contactee preference data, there may be organizational preference data. For example, when both a contactor and contactee belong to the same organization (e.g., company, university, fraternity), then the contactor preferences and the contactee preferences may be blended together in accordance with organizational policies.

The contactor data and the contactee data may include information describing current conditions and information that facilitates predicting future conditions. For example, a phone system may currently be under a great load (e.g., five minutes after earthquake), but data concerning phone usage patterns may be analyzed to facilitate determining the likelihood that that phone will be available at a point of time in the future (e.g., twenty-four hours after earthquake).

The analysis of 920 can model utilities that consider the relationships between contactor and contactee preferences. For example, if both parties prefer real-time telephone communications, then there may be a high utility to arranging real-time telephony, but if one party prefers email and another party prefers video-conferencing, then real-time communications may not be preferred. In addition to blending the contactor preference data with the contactee preference data, there may be blending with organization preference data. For example, when both a contactor and contactee belong to the same organization, then the contactor preferences and the contactee preferences may be blended together in accordance with organization policies. For example, although neither the contactor nor the contactee typically encrypts email, the organization may prefer communications between members to be encrypted and thus the present invention facilitates implementing such desired reliability levels.

The present invention facilitates using multiple decision-making methods, where the best method is selected in different situations. For example, one decision may be made using simple priority rules, another by a policy that takes as input key aspects of the communication context, the contactee's preferences and the context of the contactee and/or contactor. In another case, a decision may be made employing decision-theoretic reasoning concerning the value of the communication given a consideration of the uncertainties about the context. In addition, the decisions can be made sensitive to dates and times, considering specific assertions about particular time horizons to guide communications. Thus, at 930, one or more rules may be selected from a set of possible rules, where the rules can be employed to determine conditional expected utilities. For example, given a large set of communication channels and/or preferences, a first set of rules may be selected but given a small set of communication channels and/or preferences, a second set of rules may be selected. The rules may be selected on other parameters including, but not limited to, the number of matching preferences, the number of matching capabilities, the nature and quality of the contexts, the type and number of communications requested and the time critical nature of the desired communication. The rules may have been specified by the contactee, for example. By way of illustration, contactees can specify groups of people and attributes concerning the nature of the contact and rules for communicating given the context (e.g., time, task, goals, location, contactor).

At 940, the rules selected at 930 are employed to determine one or more conditional expected utilities for the candidate communication channels. By determining a set of conditional expected utilities, that include both immediately available channels and channels predicted to be available at a point of time in the future, the present invention facilitates optimizing the utility of the communication, thus providing improvements over conventional systems.

At 950, the expected reliability of the candidate communication channels for which conditional expected utilities were computed at 940 is computed. Such expected reliability may consider data including, but not limited to, the reliability history of the communication channel, the reliability history of a current communication, a communication length, a communication type, the mean time between failure of the communication channel, the average failure duration of the communication channel, the average percent degradation of the communication channel, load, time of day, network traffic, atmospheric conditions associated with the communication channel, scheduled communication channel maintenance and scheduled communication channel downtime.

The reliability history of the communication channel may include, for example, data concerning dates, times and durations of recent degradations. The reliability history of the current communication may include, for example, data concerning degradation of the current communication. For example, if the current communication is a satellite telephone call, then the reliability history of the current communication may include an average signal to noise ratio, a maximum signal to noise ratio, and the number of times the call has been dropped. If the communication length is known, (e.g., an email message), then the communication length may contain such deterministic data. But if the communication length is not known, then in one example of the present invention, reasoning under uncertainty that considers the identity and context of the parties may be employed to predict the communication length. For some communication channels the likelihood that a communication will be degraded may be directly proportional to the length of the message. Atmospheric conditions may affect the reliability of a communication. For example, the presence of sun spots, a lightning storm, heavy rain, dense fog and the like may affect the reliability of communications. By way of illustration, very heavy rain interposed between a receiver and a satellite can interrupt a digital satellite signal to a direct television system. Perhaps some of the simplest reliability factors to account for are scheduled maintenance and scheduled downtime. The reliability of a channel is likely to be substantially zero if the channel is scheduled to be down during the anticipated time of the desired communication.

Based on the analysis of 950, the conditional expected utility of the communication via a channel as computed at 940 may be updated. For example, considering reliability of a channel as the likelihood that the channel will be available, the expected utility (EU) of choosing that channel may be computed according to:

$$EU(\text{channel}) = \text{conditional utility}(\text{channel}) * \text{predicted reliability}(\text{channel})$$

where conditional utility is related to the determination of the expected utility as related to party context and preference (e.g., block 940 result) while the predicted reliability, representing the likelihood that a channel is available is related to the processing of 950, for example.

In one example of the present invention, information is presented to contactors and/or contactees to engage them in a dialog to facilitate scheduling a communication. The dialog may produce entity selection data concerning the communication, where such data can be employed to choose between possible communication channels. Thus, at 970, information concerning the possible communication channels and their expected utilities can be presented to a contactor and/or contactee. Such presentation may be tailored to a user interface associated with a device that a party has established as a desired presentation device. Such devices can include, but are not limited to, a computer display, a television display, a PDA display, a telephone display, an audible signal, and the like. Thus, the contactor and/or contactee can select from the possible communications that are identified as maximizing the utility of the communication for which the reliability of the channel has been accounted. For example, a contactor may want to place a real-time telephone call, but may be presented with a list of other communication channels that may produce higher utilities (e.g., high priority page to a person in a meeting where there is no telephone, real-time telephone call to contactee's assistant). Similarly, the contactee may be informed that the contactor is trying to contact them, and the contactee may be given the opportunity to override their preferences based on their current capabilities. By way of illustration, the contactee may be at home watching a movie at two a.m. when the preferences indicate that no real-time phone communications are desired. Since the present invention determined that the contactee was immediately reachable, the contactee may be presented, on the television, with a list of options for being contacted by the contactor (e.g., phone call, email, streaming video) and may be given the opportunity to override the preferences (e.g., willing to accept a phone call from the police department). Such overriding and/or responses to options can be employed in ongoing machine learning to facilitate improving the performance of the method 900 by, for example, adapting the rules of 930 and 940.

At 980, once the optimal communication channel(s) have been identified, by the method and/or by the contactor and/or contactee, then the communication can be scheduled, calendared and/or initiated. At 990 a determination is made concerning whether another communication is desired. If the determination at 990 is NO, then processing concludes, otherwise processing continues at 920.

The method 900 is not limited to one-on-one communications. Groups may be linked together using method 900 by analyzing data (e.g., reliability, hardware, software, context, preferences) of more than two communicators. By way of illustration, a network meeting (e.g., high stakes online auction) may be considered. If some members have high speed network access while others have only low speed dial-up access to the meeting, then the utility of the group communication may be maximized by rescheduling it to a time when all the parties have high speed access. Thus, no bargaining member may feel that they are at a disadvantage, which could produce lower auction activity and lower price.

Figure 10:
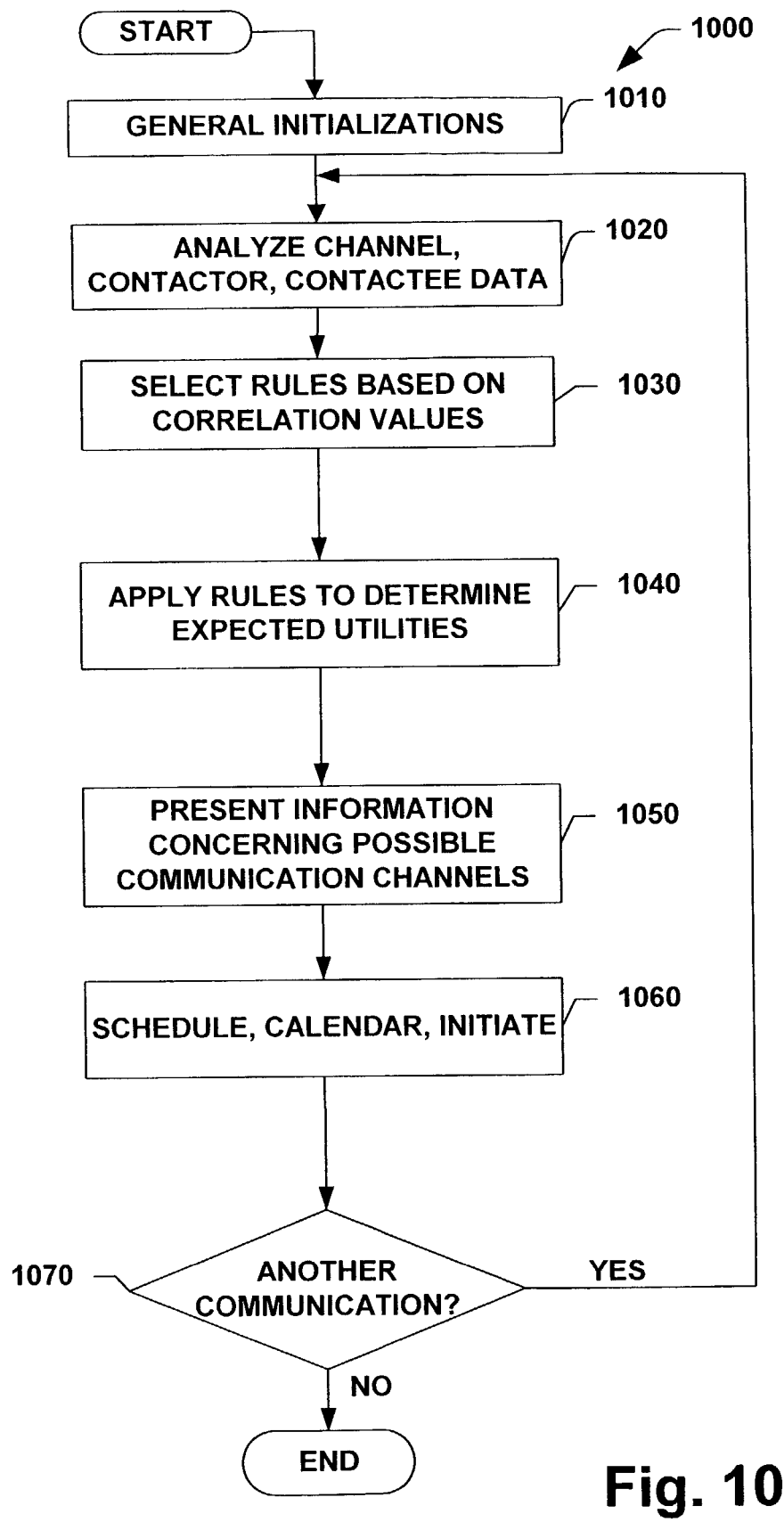
FIG. 10 is a flow chart illustrating another methodology for carrying out an aspect of the present invention.

FIG. 10 illustrates a method 1000 that can be employed for identifying a communication channel that will maximize the utility of a communication that employs that channel, where the utility depends, at least in part, on the predicted reliability of the channel. At 1010, general initializations occur. Such initializations can include, but are not limited to, identifying potential communication channels, allocating memory, establishing pointers, establishing data communications, acquiring resources, setting variables and displaying process activity.

At 1020, channel, contactor and contactee data is analyzed. Thus, 1020 contrasts with 920 (FIG. 9) where contactor and contactee data were initially analyzed, with channel data subsequently analyzed at 950 (FIG. 9). In method 900 (FIG. 9), a channel manager would first compute a conditional expected utility and then update that utility based on reliability processing. In method 1000, the channel data, which contributes to the predicted reliability, is considered substantially in parallel with the contactor and contactee data (e.g., context, preferences). Thus, at 1030, based on the channel, contactor and contactee data, one or more rules for computing a utility are selected. Such rules may be selected, for example, based on the ratio of determined data to inferred data, on the amount of data, on the amount of time for making a decision and on user configuration options.

At 1040, the selected rules are employed to calculate an expected utility for the communication(s) along the potential communication channels. In one example of the present invention, such expected utilities may be ranked, and a communication may be automatically initiated based on the maximum utility. In another example of the present invention, at 1050, information concerning the possible communication channels and their associated utilities may be presented to communicating parties and/or controlling parties. By way of illustration, in a two party communication, the parties may be presented with a user interface on a computer that displays the communication choices. When the parties agree on a choice, then the communication may be scheduled. By way of further illustration, in a multiple party communication, a central controlling authority may be presented information concerning the possible communications, which facilitates adhering to organizational policy concerning group communications.

At 1060, based on the information presented at 1050, one or more communications between two or more communicating parties may be scheduled, calendared and/or initiated. For example, an immediate email may be sent indicating that a network meeting has been scheduled for the next day at noon. At 1070, a determination is made concerning whether there is another communication. If the determination at 1070 is YES, then processing returns to 1020, otherwise processing can conclude.

Figure 11:
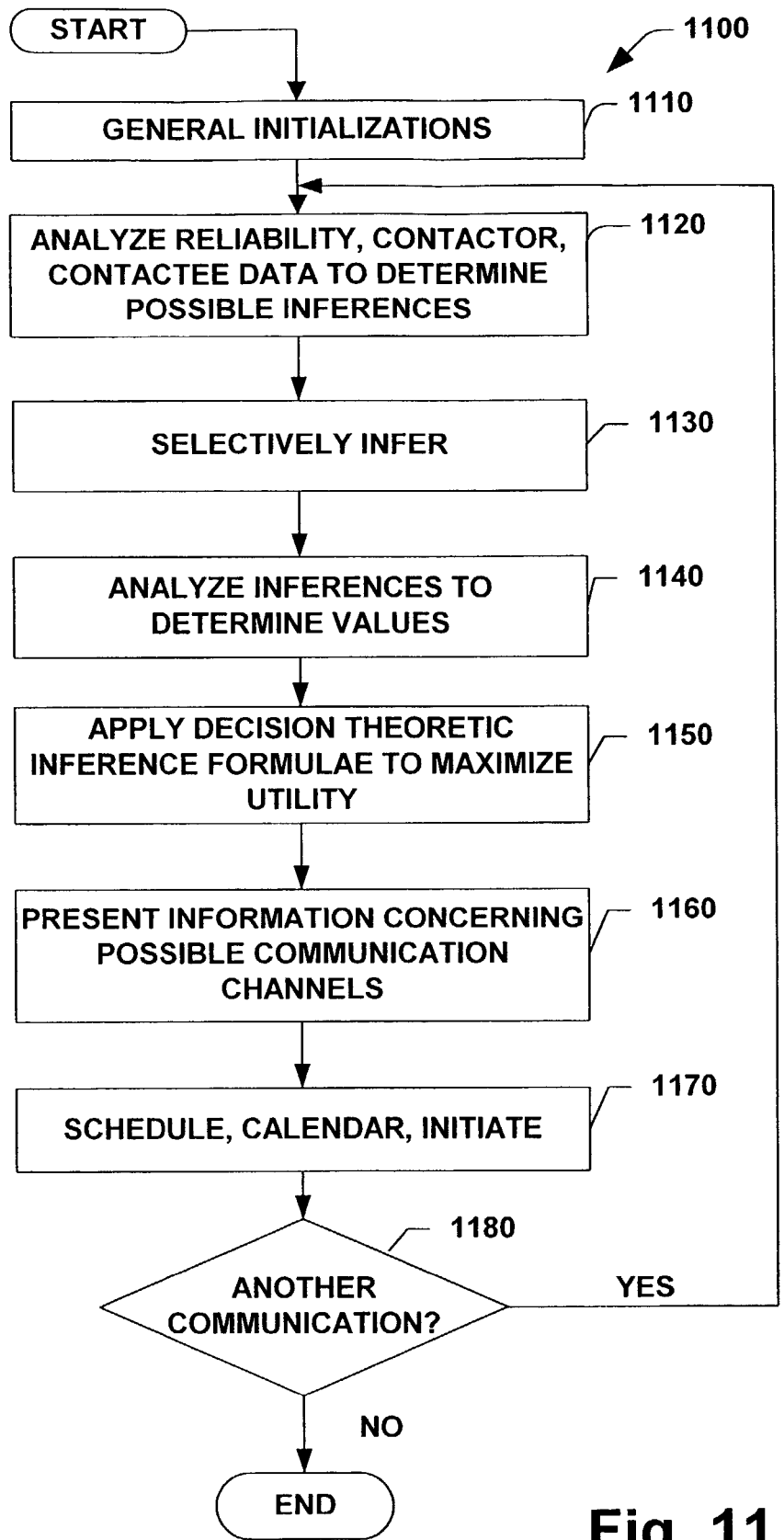
FIG. 11 is a flow chart illustrating another methodology for carrying out an aspect of the present invention.

Turning now to FIG. 11, a flow chart illustrates a method 1100 for identifying a communication channel that will facilitate maximizing the utility of a communication between two or more communicating parties, where the decision considers the predicted reliability of the channel(s) by which the communication(s) will be made in determining the optimal channel. The method 1100 addresses reasoning under uncertainty concerning one or more data points employed in determining a maximum utility for a communication. At 1110, general initializations occur. Such initializations can include, but are not limited to, allocating memory, establishing pointers, establishing data communications, acquiring resources, setting variables and displaying process activity.

At 1120, data including, but not limited to, contactor data, contactee data and communication channel data (e.g., reliability data) is analyzed to determine correlations that can be made and inferences that need to be made. The communication channel data can include, but is not limited to, the reliability history of the communication channel, the reliability history of a current communication, a communication length, a communication type, the mean time between failure of the communication channel, the average failure duration of the communication channel, the average percent degradation of the communication channel, load, time of day, atmospheric conditions associated with the communication channel, scheduled communication channel maintenance and scheduled communication channel downtime. The communication channel data may be incomplete. Thus, one or more inferences concerning the communication channel data may be required. By way of illustration, the communication length may not be known. However, given the identity of the parties and the subject matter of the communication, an inference may be made concerning the likely communication length. For example, two attorneys communicating concerning a contract to purchase real estate may typically exchange documents totaling two megabytes of data, while the same two attorneys communicating concerning a tee time may typically exchange one kilobyte of data. Thus, since the likelihood that a communication will suffer degradation can be directly related to the length of a communication, the predicted reliability can benefit from an inference concerning the communication length if such deterministic data is unavailable.

The contactor data, which may be incomplete, can include, but is not limited to, context data and preference data. The context data, which can also be incomplete, can include data gathered by watching the contactor and or observing the contactor's environment. For example, light levels may be analyzed to determine whether textual communications are practical. But there may be gaps in the contactor context data. For example, information concerning the light level of the contactor may not be available, and thus inferences concerning such light may be required to be made from data like the location of the contactor (e.g., in a darkroom, in a truck) and the time of day (e.g., during daylight hours, late at night). The contactee data may similarly be incomplete and may similarly benefit from inferring values for missing data points.

The contactor data, the contactee data and the channel data may include information describing current conditions and information that facilitates predicting future conditions. For example, a phone may currently be in use, but data concerning phone usage patterns may be analyzed to facilitate determining the likelihood that a phone will be available at a point of time in the future.

Thus, at 1130, selected inferences may be made. By way of illustration, $p(\text{communication length}|E_{parties}, E_{topic})$ may be inferred to produce a conditional probability associated with the length of a certain communication, where $E_{parties}$ is evidence observed and/or inferred about the parties and $E_{topic}$ is evidence observed and/or inferred about the topic of the communication. By way of further illustration, $p(\text{context}|E)$ may be inferred to produce the conditional probability that a recipient (contactee) has a given context given certain evidence E. Similarly, an inference can be made concerning the likelihood of obtaining access to a channel within a time frame t, where the likelihood that channels could be made available by time t is represented by $p(m^c_k(t)|E)$.

At 1140, values associated with the inferences of 1130 can be analyzed to determine one or more values that may be employed in inference formulae that are employed to determine a communication with a maximum utility. The inference formulae may be, for example, decision-theoretic formulae. At 1150, inference formulae may be employed to determine the maximum utility for a communication. In one example aspect of the present invention, a basic decision-theoretic formula employed in decision-making under uncertainty in the context of a contactee is:

$$A^* = \underset{j}{\mathrm{argmax}} \sum_{i} p(\mathrm{reliability} A_i^C \mid E) \times \quad \text{(Equation 1')}$$
$$u(A_j, A_c^k, C, \mathrm{context}^R, \mathrm{context}^C)$$

The basic formulation for identifying optimal communication channels can be extended by introducing uncertainty about the contactor's context, and/or the reliability, which leads to:

$$A^* = \underset{j}{\mathrm{argmax}} \sum_{i} \sum_{k} \sum_{s} p(\mathrm{context}^R i \mid E) p(\mathrm{context}^C k \mid E) p(\mathrm{reliability}_s \mid E) \times u(Aj, A^c init, \mathrm{context}^R i, \mathrm{context}^C k) \quad \text{(Equation 2')}$$

Variables associated with channel reliability, contactor and/or contactee contexts can be treated as explicit deterministic or probabilistic factors in optimization processing associated with identifying the optimal communication channel. Thus, equation 3 considers combinations of such channels.

$$A^* = \underset{l,n,k}{\mathrm{argmax}} \sum_{i} \sum_{k} \sum_{s} p(\mathrm{context}^R i \mid E) p(\mathrm{context}^C k \mid E) p(\mathrm{reliability}_s \mid E) \times u(A(m_1^R, m_n^C), A^c init, C, \mathrm{context}^R i, \mathrm{context}^C k) \quad \text{(Equation 3)}$$

The present invention may further compare the best option for communication available now with the best communication option that will be available later, and update the value of the communication for the losses based in delays in communication, and potential gains or losses based on changes in disruptiveness if the communication should come at the later time t when the channel has a different reliability (e.g., more reliable, less reliable), which leads to equation 4.

$$\text{Value} A^{*\prime}(t_+) - \text{Value } A^*(t_0) = \quad \text{(Equation 4)}$$
$$\underset{l,n}{\max} \sum_{i} \sum_{k} \sum_{s} p(\mathrm{context}^R i \mid E, t^+) p(\mathrm{context}^C k \mid E, t^+) p(\mathrm{reliability}_s \mid E, t^+) \times$$
$$u(A(m_1^R(t^+)), A_{init}^C, C, \mathrm{context}^R i(t^+), \mathrm{context}^C k(t^+)) -$$
$$\underset{l,n}{\max} \sum_{i} \sum_{k} \sum_{s} p(\mathrm{context}^R i \mid E, t^0) p(\mathrm{context}^C k \mid E, t^0) p(\mathrm{reliability}_s \mid E, t^0) \times$$
$$u(A(m_l^R(t^0)), A_{init}^C, C, \mathrm{context}^R i(t^0), \mathrm{context}^C k(t^0))$$

Thus, decision-theoretic formulae like those described in equations 1 through 4 may be employed at 1150 to produce one or more expected utilities. Thus, rather than the two step process described in connection with FIG. 9 that included computing a conditional expected utility (e.g., a preference-based expected utility) and updating the conditional expected utility based on the predicted reliability, the method of FIG. 11 factors the reliability in the initial utility calculations. In one example aspect of the present invention, a communication would automatically be initiated, scheduled and/or calendared for a channel with desired reliability characteristics based on such information. But in another aspect of the present invention, information concerning the expected utilities may be presented to one or more parties, as at 1160. By way of illustration, a contactor may be presented with a list of communications with high utilities determined in accordance with the preferences of the contactee and the reliability of the channels. The contactor may then select from the list.

Based, at least in part on the selection of 1160, one or more communications may be initiated (e.g., phones dialed, email composer/receiver popped up), scheduled and/or calendared at 1170 for reliable communication channels. At 1180 a determination is made concerning whether another communication should be processed. If the determination at 1180 is YES, then processing continues at 1120, otherwise processing concludes.

Figure 12:
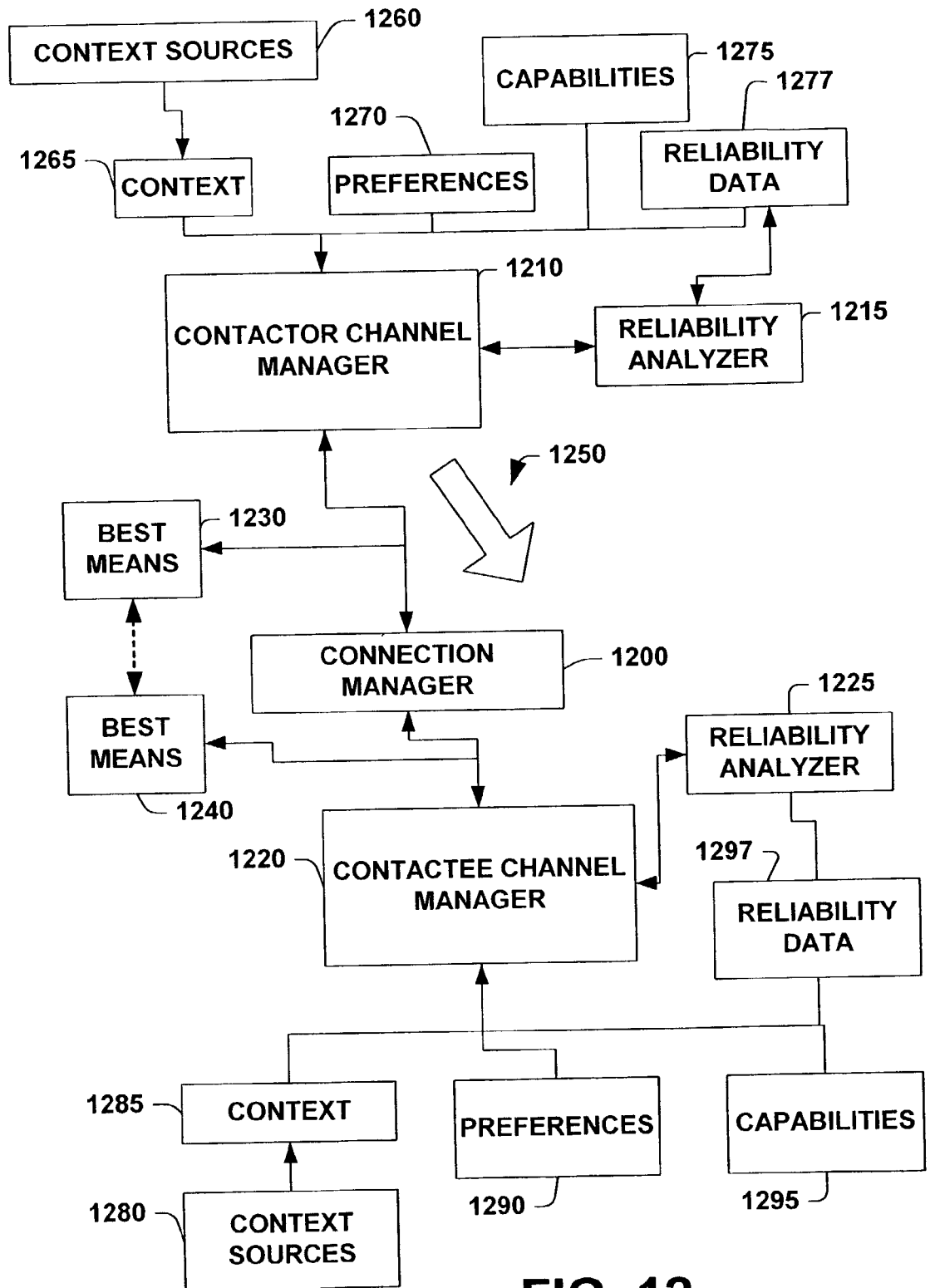
FIG. 12 illustrates processing associated with a contactor attempting a communication, in accordance with an aspect of the present invention.

FIG. 12 illustrates communicating parties employing the present invention and processing associated with a contactor attempting a communication. A connection manager 1200 is operably connected to a contactor channel manager 1210 and a contactee channel manager 1220, where the contactor channel manager 1210 and the contactee channel manager 1220 are examples of the channel manager described herein. The channel manager 1210 is operably connected to (e.g., in electrical, data, functional and/or physical contact with) a reliability analyzer 1215, which facilitates factoring predicted channel reliability into channel selection. Similarly, the channel manager 1220 is operably connected to a reliability analyzer 1225, which similarly facilitates factoring predicted channel reliability. The connection manager 1200 communicates with the contactor channel manager 1210 and the contactee channel manager 1220 to acquire information employed in determining the optimal communication that can be achieved between a contactor best means 1230 for communicating and a contactee best means 1240 for communicating, employing, for example, the methods described in association with FIGS. 7 through 11.

The contactor channel manager 1210, after gathering information and/or making inferences concerning a context 1265 (derived from a plurality of context sources 1260), preferences 1270, capabilities 1275 and reliability data 1277, may transmit contactor schema 1250 to the connection manager 1200. The schema 1250 can hold information including, but not limited to, contactor identity, contactor history, registered documents, tasks, source channel, requested means, reliability and capabilities, for example. Similarly, the contactee channel manager 1220 may be queried, for example, by the connection manager 1200 for information including, but not limited to, contactee context 1285 (derived from a plurality of context sources 1280), contactee preferences 1290, contactee capabilities 1295 and contactee reliability data 1297. It is to be appreciated that although the contactor channel manager 1210 is described as transmitting data and the contactee channel manager 1220 is described as being queried, that other data communication methods can be employed in accordance with the present invention.

Thus, in one example of the present invention, a data packet may be transmitted between the contactor channel manager 1210 and the contactee channel manager 1220, where the data packet includes a first field that stores communication channel reliability data and a second field that stores communicating party preference data. Alternatively, and/or additionally, a data packet may be transmitted between the contactor channel manager 1210 and the contactee channel manager 1220, where the data packet includes a first field that stores communication channel reliability data and a second field that stores communication context data. Similarly, a data packet may be transmitted between the contactor channel manager 1210 and the contactee channel manager 1220, where the data packet includes a first field that stores communication channel reliability data, a second field that stores a communication channel reliability prognosis and a third field that stores a communication reliability prognosis.

One example of the present invention provides for interacting with hardware and/or software to automatically establish the identified connections. Thus, the contactor in FIG. 12 may be able to make a first decision, that they would like to communicate with a contactee, select means for establishing the "best communication" and then wait for that "best communication" to be established. For example, a programmer editing a code fragment of interest to a contactee may select a revision in the code and be presented with a menu of options concerning the revision. One of the options may be a "BestCom" option to communicate with the contactee. The programmer may then select the "BestCom" option, whereupon analysis associated with the present invention would be initiated to establish communications with the contactee. Such processing may cause the programmer to experience situations including, but not limited to, display of information concerning a phone conversation being scheduled for later, presentation of a herald that indicates that a telephone call is being put through immediately, an Instant Messenger input field popping up, an email composition form popping up with the appropriate contactee(s) populating the To: field, for example. The situation experienced by the programmer may be based on the contactee's preferences and context.

Figure 13:
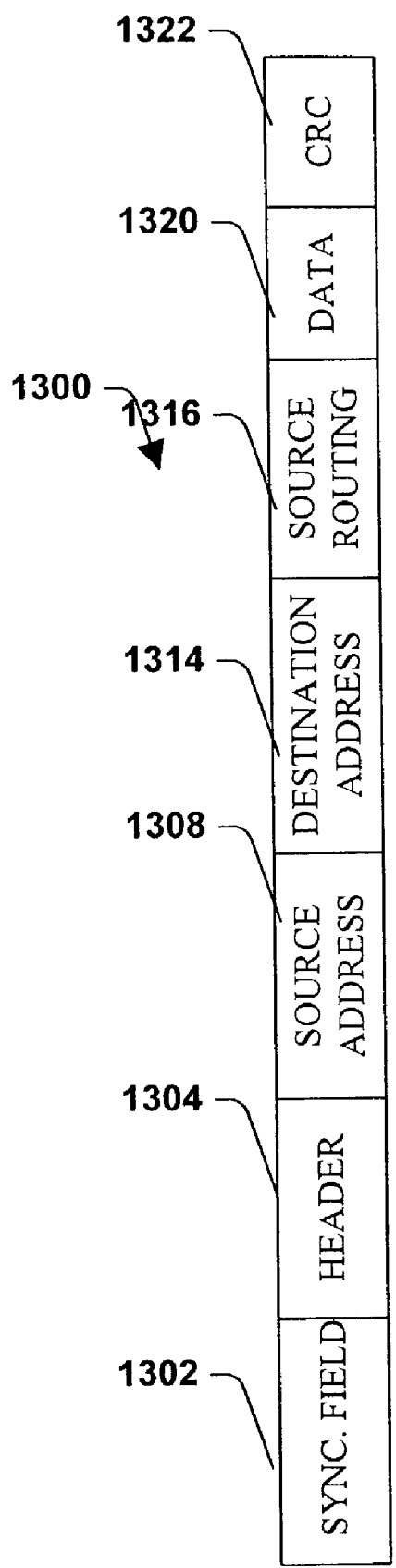
FIG. 13 is a schematic illustration of a data packet in accordance with an aspect of the present invention.

Referring now to FIG. 13, information can be transmitted between various devices and/or computer processes in a communication system via a data packet 1300, for example. An exemplary data packet 1300 is shown that could be employed in a data communication application. The data packet includes a synchronization field 1302 that includes synchronizing bits that allow a device receiving the packet 1300 an opportunity to "lock on" to the packet 1300. A header field 1304 follows the synchronization field 1302 and includes information such as the length and type of packet. For example, the header field 1304 may indicate whether the packet 1300 is a packet type that requires a response from the receiving device. A source address field 1308 follows the header field 1304 and includes the address of the device from which the packet 1300 originated. Following the source address field 1308, the packet 1300 includes a destination address field 1314 that holds the address of the device to which the packet 1300 is ultimately destined. In the event the communication is via a local area network (LAN) utilizing source routing whereby a device transmitting a packet 1300 identifies a particular route along the LAN on which the packet 1300 is to be transmitted, such information is included in a source routing field 1316 included in the packet 1300. In a non-source routed LAN, the source routing field 1316 is omitted and the packet 1300 is broadcast throughout the entire network absent specified routing.

A data field 1320 in the packet 1300 includes various information that is intended to be communicated to the receiving device. The packet 1300 ends with a cyclical redundancy check (CRC) field 1322 that serves as an error correcting field whereby a receiving device can determine if it has properly received a packet 1300.

Figure 14:
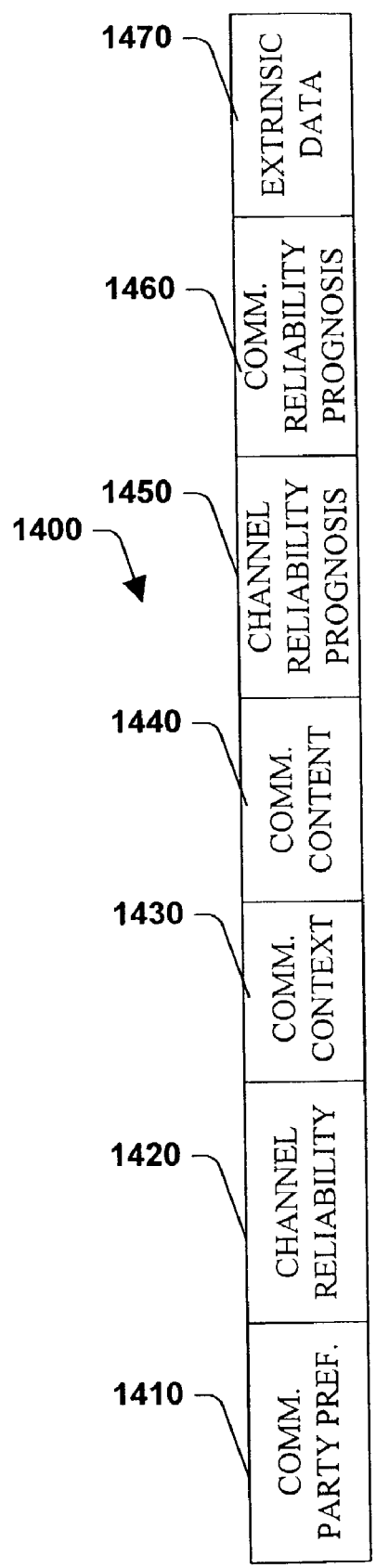
FIG. 14 is a schematic illustration of sub-fields of a data field in accordance with the present invention.

FIG. 14 is a schematic illustration of sub-fields 1400 within the data field 1320. The sub-fields 1400 discussed are merely exemplary and it is to be appreciated that a greater or lesser number of fields could be employed with various types of data germane to facilitating a communication utility analysis in accordance with the present invention. The sub-fields 1400 include a communicating party(s) preference field 1410 that can include contactor preference data and/or contactee preference data. A channel reliability field 1420 can include information relating to the reliability of a particular channel and/or group of channels. A communication context field 1430 can include information regarding the context of a communication between parties. Other sub-fields that could be included are a communication content field 1440, a channel reliability prognosis field 1402, a communication reliability prognosis field 1460, an extrinsic data field 1470, and a variety of other sub-fields as discussed.

FIG. 15 schematically illustrates a representative data structure 1500 in connection with the subject invention. The data structure 1500 is merely exemplary and it is to be appreciated that numerous other structures are contemplated that provide for organizing and/or storing a plurality of data types conducive to carrying out a communication utility analysis in connection with the subject invention. Any such data structure suitable for employment in connection with the present invention is intended to fall within the scope of the hereto appended claims.

The data structure 1500 includes contacting party preferences, channel types, channel reliability, prognosed channel reliability, extrinsic information, communication content, communication context, communication environment, and a variety of other data fields. Thus, in one example of the present invention, a memory that stores data that can be accessed by a computer component may store a data structure that holds a first field that stores channel reliability information and a second field that stores communicating party preference information. Alternatively and/or additionally, a memory that stores data that can be accessed by a computer component may store a data structure that holds a first field that stores channel reliability information and a second field that stores communication context information. Similarly, a memory that stores data that can be accessed by a computer component may store a data structure that holds a first field that stores channel reliability information, a second field that stores channel reliability prognosis information and a third field that stores communication reliability prognosis information may be employed.

FIG. 16 schematically illustrates a communication analyzer 1600 in connection with the present invention. The communication analyzer 1600 can be resident on a single communication device and facilitate maximizing utility via the device, or be part of a communication network and manage communications between communicating parties and facilitate maximizing utility of a communication between the parties. It is to be appreciated that multiple communication analyzers 1600 could be employed as part of a network wherein a plurality of devices/clusters/systems include respective analyzers 1600 that work together to facilitate optimizing communication between parties. The analyzer comprises a channel manager 150, a reliability analyzer 220, a reliability predictor 222, a reliability integrator 224 and a channel data store 250. These respective components were discussed in detail herein and therefore further discussion related thereto is omitted for sake of brevity.

FIG. 17 is an illustration of N number of first entities 1700 (e.g., individual(s) and/or device(s) and/or cluster(s) and/or system(s)) (N being an integer) that include reliability analyzers 1600 and M number of second entities 1710 (e.g., individual(s) and/or device(s) and/or cluster(s) and/or system(s)) (M being an integer) that do not include a communication analyzer. The first entity(s) 1700 may desire to communicate amongst themselves via any of a plurality of communication channels, and a subset of the first entities may desire to communicate with a subset of the second entities 1710 via one or more of a plurality of communication channels 1720. The respective communication analyzer(s) 1600 facilitate maximizing communication utility by selecting the best communication channel of the channels 1720 to employ based on a utility analysis as discussed herein. In the event two or more communication analyzers are concurrently involved with channel selection, the respective communication analyzers can coordinate, address conflicts and select channel(s) that maximize overall utility. However, it is to be appreciated that certain communication analyzers can have higher authority than other analyzers and thus the hierarchical ranking of the analyzers can be part of the utility analysis. Additionally, a single communication analyzer could be selected to perform channel selection like a network manager while the others sit idle.

Figure 18:
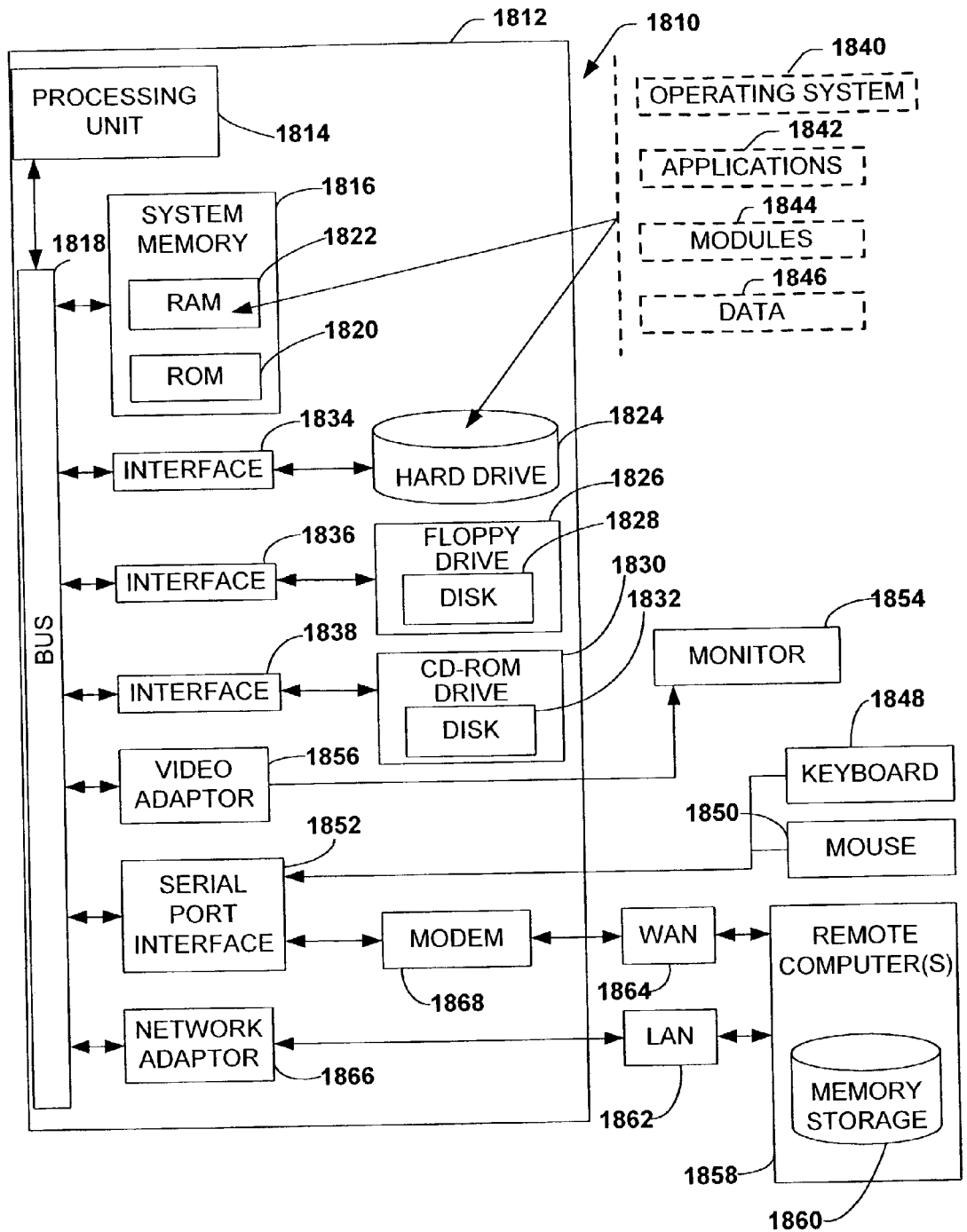
FIG. 18 is a schematic block diagram of an exemplary operating environment for a system configured in accordance with the present invention.

In order to provide additional context for various aspects of the present invention, FIG. 18 and the following discussion are intended to provide a brief, general description of a suitable computing environment 1810 in which the various aspects of the present invention may be implemented. While the invention has been described above in the general context of computer-executable instructions that may run on one or more computers, it will be appreciated that the invention also may be implemented in combination with other program modules and/or as a combination of hardware and software. Generally, program modules include routines, programs, components, data structures, etc. that perform particular tasks or implement particular abstract data types. Moreover, it will be appreciated that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference to FIG. 18, an exemplary environment 1810 for implementing various aspects of the invention includes a computer 1812, the computer 1812 including a processing unit 1814, a system memory 1816 and a system bus 1818. The system bus 1818 couples system components including, but not limited to the system memory 1816 to the processing unit 1814. The processing unit 1814 may be any of various available processors. Dual microprocessors and other multi-processor architectures also can be employed as the processing unit 1814.

The system bus 1818 can be any of several types of bus structure including a memory bus or memory controller, a peripheral bus and a local bus using any of a variety of available bus architectures. The system memory 1822 includes read only memory (ROM) 1820 and random access memory (RAM) 1822. A basic input/output system (BIOS), containing the basic routines that help to transfer information between elements within the computer 1812, such as during start-up, is stored in ROM 1820.

The computer 1812 further includes a hard disk drive 1824, a magnetic disk drive 1826, (e.g., to read from or write to a removable disk 1828) and an optical disk drive 1830, (e.g., for reading a CD-ROM disk 1832 or to read from or write to other optical media). The hard disk drive 1824, magnetic disk drive 1826 and optical disk drive 1830 can be connected to the system bus 1818 by a hard disk drive interface 1834, a magnetic disk drive interface 1836 and an optical drive interface 1838, respectively. The drives and their associated computer-readable media provide nonvolatile storage of data, data structures, computer-executable instructions, etc. for the computer 1812. Although the description of computer-readable media above refers to a hard disk, a removable magnetic disk and a CD, it should be appreciated that other types of media that are readable by a computer, such as zip drives, magnetic cassettes, flash memory cards, digital video disks, cartridges, and the like, may also be used in the exemplary operating environment, and further that any such media may contain computer-executable instructions for performing the methods of the present invention.

A number of program modules can be stored in the drives and RAM 1822, including an operating system 1840, one or more application programs 1842, other program modules 1844 and program data 1846. It is to be appreciated that the present invention can be implemented with various available operating systems or combinations of operating systems.

A user can enter commands and information into the computer 1812 through a keyboard 1848 and a pointing device, such as a mouse 1850. Other input devices (not shown) may include a microphone, an IR remote control, a joystick, a game pad, a satellite dish, a scanner, or the like. These and other input devices are often connected to the processing unit 1814 through a serial port interface 1852 that is coupled to the system bus 1818, but may be connected by other interfaces, such as a parallel port, a game port, a universal serial bus ("USB"), an IR interface, etc. A monitor 1854 or other type of display device is also connected to the system bus 1818 via an interface, such as a video adapter 1856. In addition to the monitor, a computer typically includes other peripheral output devices (not shown), such as speakers, printers etc.

The computer 1812 may operate in a networked environment using logical connections to one or more remote computers, such as a remote computer(s) 1858. The remote computer(s) 1858 may be a workstation, a server computer, a router, a personal computer, microprocessor based entertainment appliance, a peer device or other common network node, and typically includes many or all of the elements described relative to the computer 1812, although, for purposes of brevity, only a memory storage device 1860 is illustrated. The logical connections depicted include a local area network (LAN) 1862 and a wide area network (WAN) 1864. Such networking environments are commonplace in offices, enterprise-wide computer networks, intranets and the Internet.

When used in a LAN networking environment, the computer 1812 is connected to the local network 1862 through a network interface or adapter 1866. When used in a WAN networking environment, the computer 1812 typically includes a modem 1868, or is connected to a communications server on the LAN, or has other means for establishing communications over the WAN 1864, such as the Internet. The modem 1868, which may be internal or external, is connected to the system bus 1818 via the serial port interface 1852. In a networked environment, program modules depicted relative to the computer 1812, or portions thereof, may be stored in the remote memory storage device 1860. It will be appreciated that the network connections shown are exemplary and other means of establishing a communications link between the computers may be used.

It is to be appreciated that aspects of the present invention may be embodied in a computer readable medium. Thus, a computer readable medium can store computer executable components for a system that facilitates communication between entities in accordance with the present invention. For example the computer executable components can comprise an identifying component that identifies a plurality of communication channels that respectively provide for communication between at least two entities. Furthermore, the computer executable components can comprise an analyzing component that analyzes a first communication data set associated with a first entity and a second communication data set associated with a second entity, the analyzing component identifying one or more communication channels of the plurality of channels based at least in part on analysis of the first and second communication data sets and the analyzing component establishing a communication between the entities.

Figure 19:
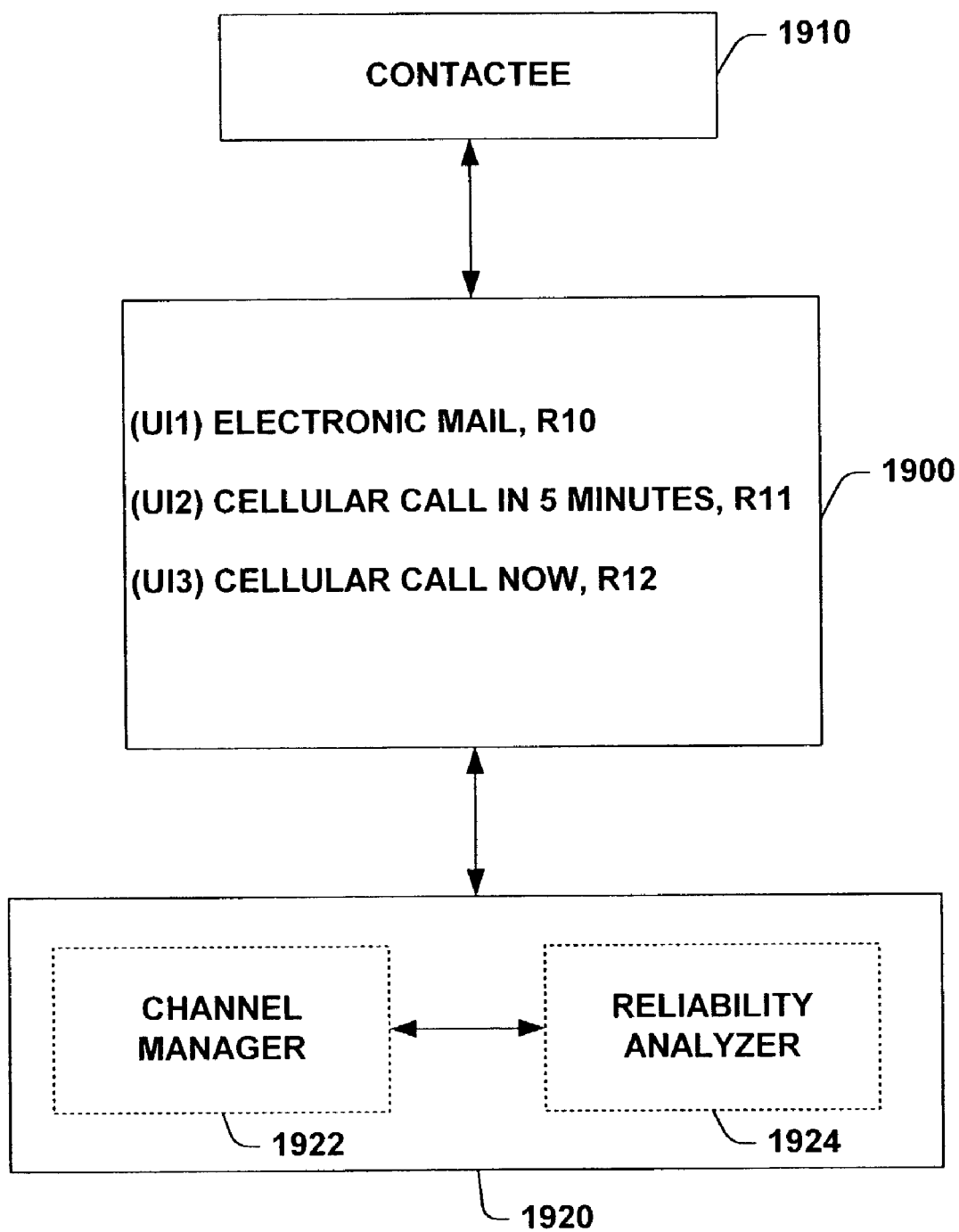
FIG. 19 is a simulated screen shot of a user interface employed in accordance with an aspect of the present invention.

Referring now to FIG. 19, a simulated graphical user interface 1900 displays communication channel choices to a contactee 1910. The communication choices UI1, UI2 and UI3 are ranked according to the predicted utility for the communication. While three choices are presented, it is to be appreciated that the graphical user interface 1900 may display a greater and/or lesser number of choices. Thus, the communication channel UI1, which indicates that communication utility will be maximized via electronic mail is at the top of the list of menu items. The graphical user interface 1900 may receive the menu entries from a system 1920 that includes a channel manager 1922 and a reliability analyzer 1924. In one example of the present invention, a computer system having a graphical user interface that includes a display and a selection device may retrieve a set of menu entries for a menu, where each of the menu entries represents a communication with a calculated expected utility. The computer system may then display the set of menu entries on the display and receive back a menu entry selection signal indicating that the selection device has been employed to select a menu entry from the set of menu entries. In response to the menu entry selection signal a communication represented by the menu entry may be initiated. While a graphical user interface 1900 is illustrated, it is to be appreciated that other user interfaces (e.g., audible, tactile) may be employed in accordance with the present invention.

Figure 20:
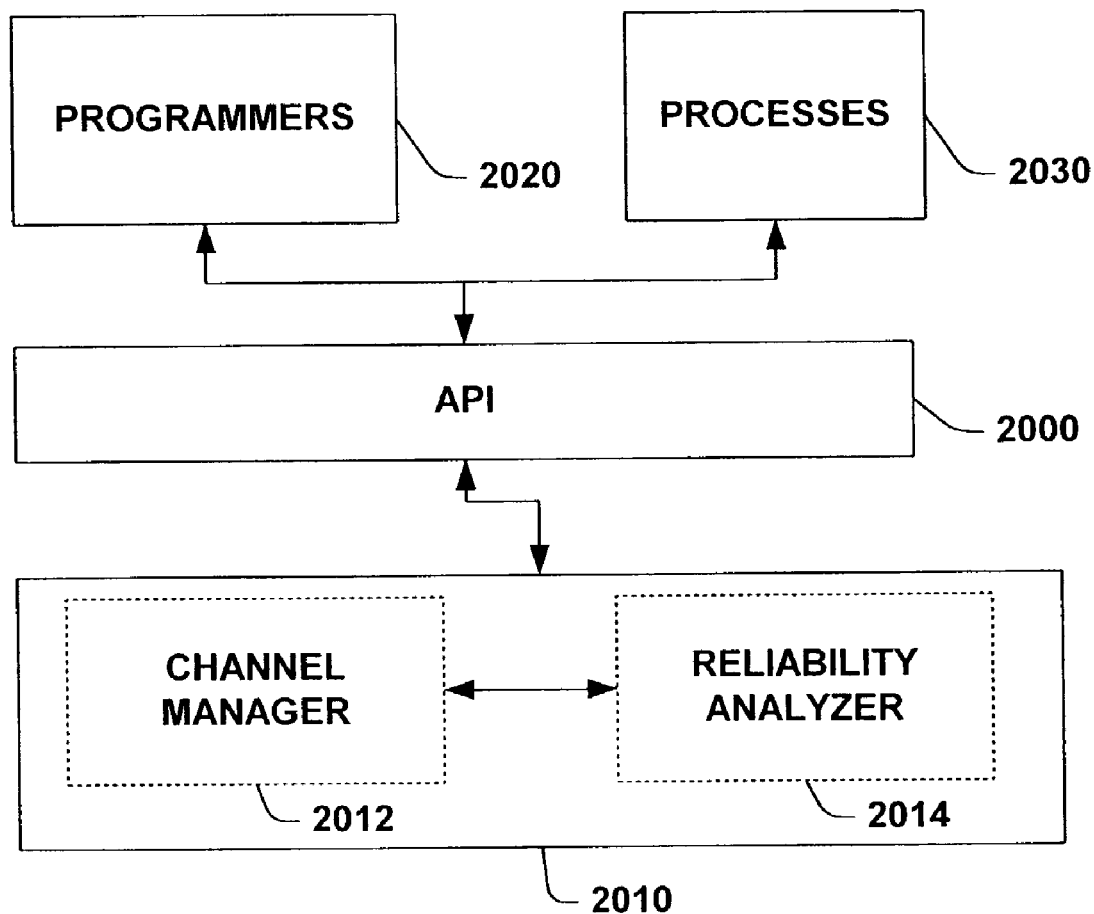
FIG. 20 schematically illustrates an application programming interface employed in accordance with an aspect of the present invention.

Referring now to FIG. 20, an application programming interface (API) 2000 is illustrated providing access to a system 2010 that includes a channel manager 2012 and a reliability analyzer 2014. The API 2000 may be employed, for example, by programmers 2020 and/or processes 2030 to gain entry to processing performed by the system 2010. Similarly, the API 2000 may be employed to provide data values to the system 2010 and/or retrieve data values from the system 2010. Thus, in one example of the present invention, a set of application program interfaces may be embodied on a computer-readable medium. The interfaces may be executed by a computer component to gain access to a communication utility analyzing program. Such interfaces can include, but are not limited to, a first interface that receives contactor information (e.g., preferences, context), a second interface that receives contactee information (e.g., preferences, context), a third interface that receives communication information (e.g., channel status, communication content), and a fourth interface that returns a utility calculation value. Such a utility calculation value may be based, at least in part, on the contactor information, the contactee information and the communication information.

Figure 21:
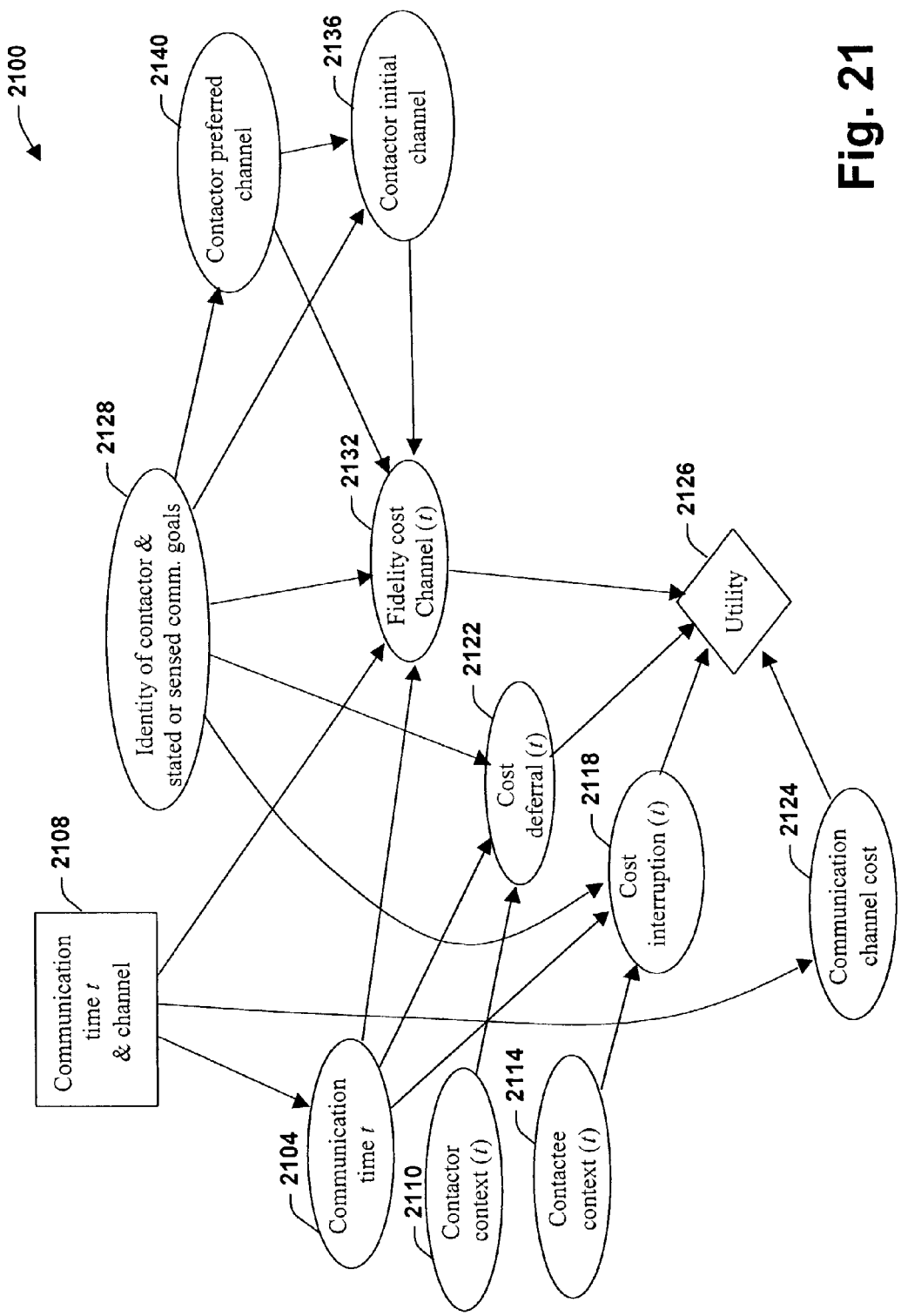
FIG. 21 is an influence diagram depicting communications interactions and variables in accordance with an aspect of the present invention.
Figure 22:
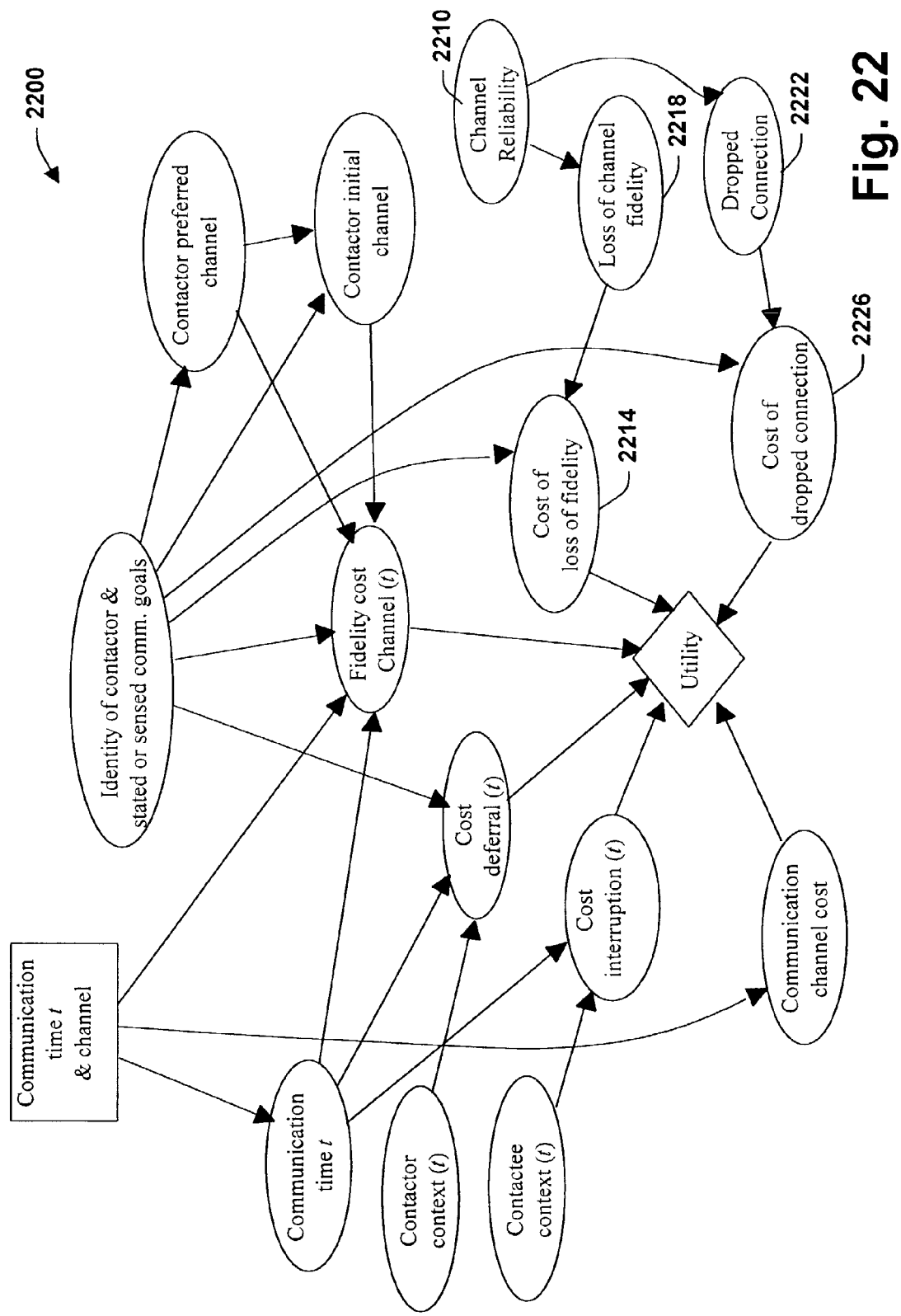
FIG. 22 is a more detailed influence diagram expanded to highlight the potential influence of the reliability of communication channels on the likelihood of significant degradation of the fidelity of the channel or the loss of the channel during the communication in accordance with an aspect of the present invention.
Figure 23:
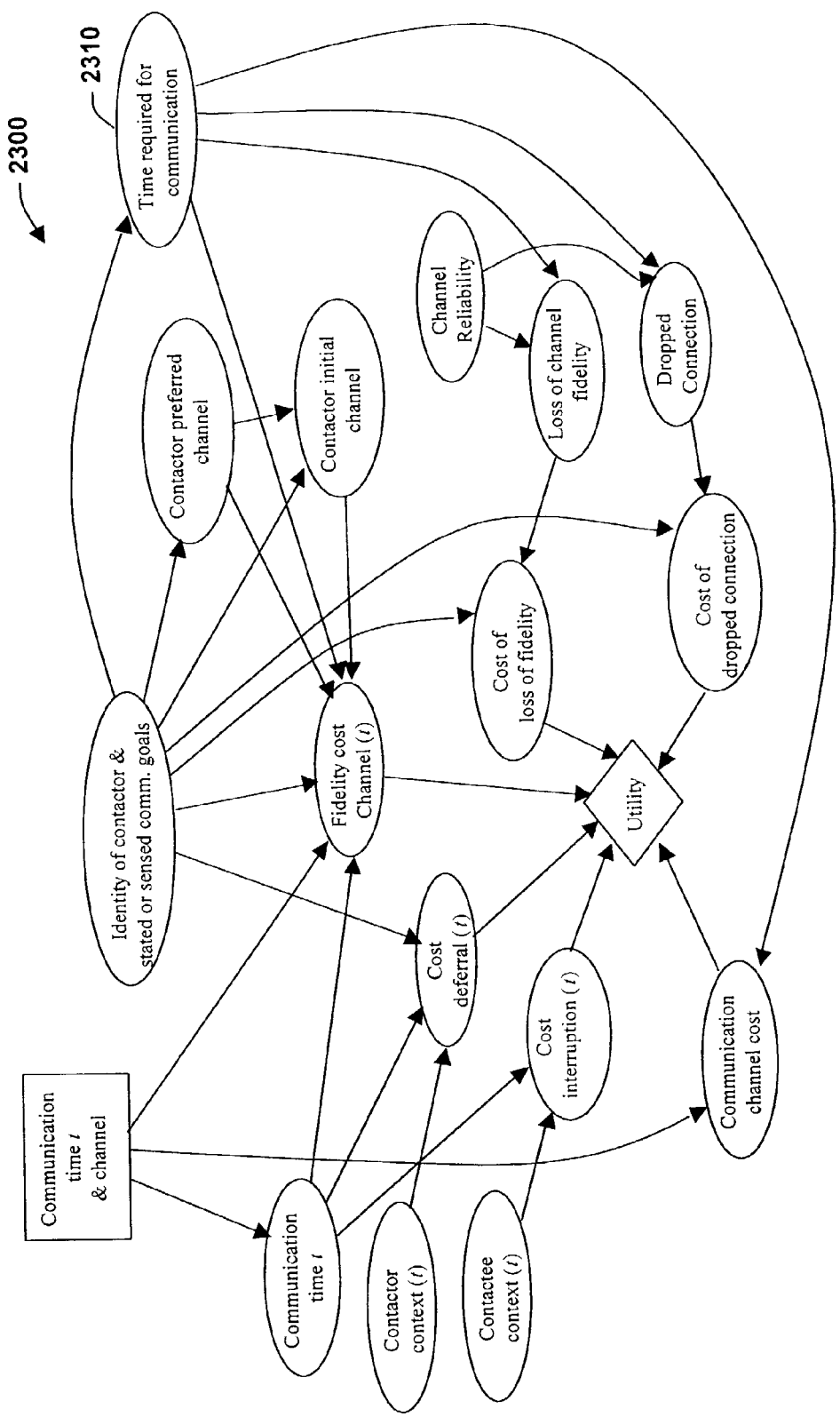
FIG. 23 is extended from the model in FIG. 22 to include a variable representing the expected time required for a communication, and how this variable is influenced by the identity and goals and, in turn, influences, along with the reliability of a selected channel, the likelihood of a loss in fidelity or loss of connection during a communication in accordance with an aspect of the present invention.

FIGS. 21–23 represent influence diagrams 2100, 2200, and 2300 capturing in more general form the decision problem associated with the present invention. Influence diagrams are well known in the decision science community as providing a representation, in a graphical manner, of a decision model, capturing key variables, actions, and preferences, under uncertainty. The influence-diagram model includes key random variables (oval nodes), actions (square node), and the overall value of the outcome of actions (diamond-shaped node). Influence diagram processing algorithms can be employed to identify the action with the highest expected utility, given the uncertainties and certainties about the variables. However, the decision models more generally represent a maximum utility decision problem, and can be solved in a variety of ways, beyond the use of special influence diagram processing algorithms. User interfaces and communications components as described herein are provided to users, making available parameters to set or modify the preferences in terms of the costs and values represented in the utility variable. User interfaces and/or other components can also provide for the specification of the allowable actions captured in the decision node, as well as for setting key uncertainties, such as prior probabilities and conditional probabilities or their approximations.

FIG. 21 depicts a basic decision model 2100 for making expected value decisions about communications, considering the time of the communication at 2104 and 2108, the context of the contactor and contactee at different times at 2110 and 2114. The context of the contactor and contactee influences the cost of interruption at 2118 and the costs of deferral at different future times at 2122, which in turn, together with the cost of the use of the communication channel at 2124, include the utility of different communication channels at 2126 and time for the communications. The cost of deferral 2122 is influenced by the identity of the contactor and the stated or sensed communication goals at 2128. The identity and goals also influences the cost associated with the fidelity of the communication channel at 2132. The model 2100 also considers the influence of the contactors initial channel of contact at 2136 and the contactor's preferred channel at 2140.

FIG. 22 is a more detailed influence diagram 2200 expanded to highlight the potential influence of the reliability of communication channels on the likelihood of significant degradation of the fidelity of the channel or the frank loss of the channel via disconnection during the communication. These variables in turn influence the overall expected value of employing that channel. Such variables include considerations of channel reliability at 2210, cost of loss of fidelity at 2214, loss of channel fidelity at 2218, a dropped connection at 2222, and cost of the dropped connection at 2226.

FIG. 23 is extended from the model in FIG. 22 to include considerations of the time expected to be required for a communication at 2310, as a function of the identity and goals of the communication, and the influence of a probability distribution over the time of the communication, and the channel reliability, on the likelihood of having different losses of fidelity and the dropping of the communication channel. These include the cost of loss of fidelity and cost of dropped connection, which influence the expected utility of the communication channel decision.

What has been described above includes examples of the present invention. It is of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising", as comprising is interpreted as a transitional word in a claim.

What is claimed is:

1. A system for increasing the utility of a communication between communicating parties, the system comprising:
    a reliability analyzer that accesses or computes the reliability of a communication channel that makes available reliability information used in decisions about an expected utility of the communication channel, the reliability analyzer further comprises a reliability predictor that predicts at least one of parameters indicating that a communication channel will experience a loss of fidelity and a loss of connection, the reliability predictor predicts a likelihood L (L being a number) that a communication channel will have a reliability R (R being a number), where the likelihood L and the reliability R are considered in predicting the communication channel reliability; and
    a channel manager that analyzes at least one of communicating party preferences and context to determine a preference-based expected utility of the communication, the channel manager employing the reliability information to facilitate determining if the communication channel maximizes the utility of the communication between the communicating parties.

2. The system of claim 1, the reliability predictor predicts a loss of connection as a function of an expected duration of a communication.

3. The system of claim 1, the reliability analyzer further comprises a reliability predictor that predicts at least one of likelihoods indicating probabilities that a communication channel will experience a loss of fidelity or a loss of connection.

4. The system of claim 1, the reliability analyzer further comprises a reliability predictor that predicts at least one of likelihoods indicating probabilities that a communication channel will experience a loss of fidelity or a loss of connection as a function of an expected duration of the communication.

5. The system of claim 1, the reliability predictor produces a likelihood function $Lf=f(reliability)$ that describes a relationship between a degree of reliability and a likelihood of achieving the degree of reliability.

6. The system of claim 5, the likelihood function Lf is computed according to a likelihood, $p(reliability|E_1)$,
    where $E_1$ is observed and/or inferred evidence concerning a communication channel.

7. The system of claim 5, the reliability is computed according to the probability of
    $p(reliability|E_1, E_2)$,
    where $E_1$ is observed and/or inferred evidence concerning a communication channel and where $E_2$ is observed and/or inferred evidence concerning communicating parties.

8. The system of claim 1 employing a decision model comprising at least one of:
    an expected value decision about communications between parties;
    a time parameter relating to the communications; and
    a control decision for communications between the parties based in part on the expected value decision, the time parameter, and at least one of a context of at least one of the parties and a parameter associated with a reliability determination.

9. The system of claim 8, the context of the parties influencing at least one of a cost of interruption and a cost of deferral at different future times.

10. The system of claim 9, further comprising determining a cost of the use of at least one communication channel.

11. The system of claim 10, further comprising at least one of determining a utility of different communication channels, and determining a time for communications.

12. The system of claim 9, the cost of deferral is influenced by at least one of an identity of a party and one or more stated or sensed communication goals.

13. The system of claim 12, the identity and goals further influence a cost associated with a fidelity of a communication channel.

14. The system of claim 13, further comprising determining an influence of a party's initial channel of contact and the party's preferred channel.

15. The system of claim 8, the reliability determination includes an influence of a random variable representing reliability of communication channels on other random variables representing the likelihood of significant degradation of the fidelity of the channel or the frank loss of the channel via disconnection during a communication.

16. The system of claim 15, the other random variables in turn influence an overall expected value of employing that channel.

17. The system of claim 16, further comprising a random variable representing time expected to be required for a communication as a function of an identity and goals of the communication.

18. The system of claim 17, the random variable influences a probability distribution over the time of the communication.

19. The system of claim 18, further comprising at least one of the following variables that influence an expected utility of a communication channel decision:
   a channel reliability variable;
   a loss of fidelity variable;
   a dropped connection variable;
   a cost of loss of fidelity variable; and
   a cost of dropped connection variable.

20. The system of claim 1, the reliability predictor predicts a reliability R according to the formula
   R(channel)=f(CH_type, CM_length, CH_history, Context_sender, Context_receiver),
   where CH_type is the channel type, CM_length is the communication length, CH_history is the channel history, Context_sender is the context of the sender and Context_receiver is the context of the receiver.

21. The system of claim 1, the reliability predictor predicts a likelihood L according to the formula
   $L(R)=p(R(channel)|E_3)$,
   where $E_3$ is observed and/or inferred evidence concerning the communication channel where the reliability predictor predicts a likelihood L according to the formula
   $L(R)=p(R(channel)|E_3,E_4)$,
   where $E_3$ is observed and/or inferred evidence concerning the communication channel, and where $E_4$ is observed and/or inferred evidence concerning the communicating parties.

22. The system of claim 1, where in analyzing the reliability of a communication channel, the reliability analyzer considers a communication channel data comprising at least one of: a reliability history of the communication channel, a reliability history of a current communication, a communication length, a communication type, a mean time between failure of the communication channel, an average failure duration of the communication channel, an average percent degradation of the communication channel, an atmospheric condition, a scheduled communication channel maintenance, a scheduled communication channel downtime and a context of the communicating parties.

23. The system of claim 1, the channel manager analyzes;
   a communication channel data set,
   a first communicator data set associated with a first communicating party, and
   a second communicator data set associated with a second communicating party,
   where the channel manager selects a subset of potential communication channels that are predicted to optimize the utility of a communication between the first communicating party and the second communicating party based on the analysis of the communication channel data set, the first communicator data set and the second communicator data set.

24. The system of claim 23, the potential communication channels comprise at least one of: telephone channels, facsimile channels, computer channels, paging channels, radio channels, television channels and personal channels.

25. The system of claim 23, the channel manager performs at least one of:
scheduling a communication, calendaring a communication, presenting information concerning a potential communication, canceling a communication and initiating a communication.

26. The system of claim 23, the first communicator data set comprises:
   a contactor context data, and
   a contactor preference data.

27. The system of claim 23, the second communicator data set comprises:
   a contactee context data, and
   a contactee preference data.

28. The system of claim 1, the channel manager further comprises;
   a preference resolver that analyzes at least two of a contactee preference data, a contactor preference data and an organizational preference data to produce a resolved preference data, where the resolved preference data accords different weights to at least one of the contactee preference data, the contactor preference data and the organizational preference data based on one or more relationships between a contactee, a contactor and an organization;
   a context analyzer that analyzes a contactee context data and a contactor context data to produce an analyzed context data;
   a channel analyzer that analyzes a communication channel data set, and produces an analyzed communication channel data set; and
   a communication channel selector that selects a subset of communication channels between the contactor and the contactee based on the resolved preference data, the analyzed context data, the analyzed communication channel data set and an input from the channel analyzer and/or reliability prediction integrator.

29. The system of claim 28, where a likelihood L and/or a reliability R are employed to modify the subset of communication channels.

30. The system of claim 1, further comprises at least one of: a hardware reliability history data, a hardware capacity data, a hardware bandwidth data, a hardware availability data, a hardware status data, a hardware cost data, a hardware revision data, a hardware metadata, a software reliability history data, a software capacity data, a software version data, a software cost data, a software capability data, a time of day data, a current activity data, a current task data, a calendar data, a location data, a contactor to contactee history data, an attentional status data, a contactor class data, and an environment data.

31. A method for identifying a communication channel that facilitates optimizing the utility of a communication between communicating parties, the method comprising:
   identifying a potential communication channel for the communication; and
   determining an expected utility associated with the communication based on analyzing communication channel reliability, communicating party preferences, and communicating party context, where data associated with the communication channel reliability is stored in a communication channel data comprising:
deterministic data associated with the communication channel; and
inference data associated with the communication channel.

32. The method of claim 31, where analyzing the communication channel reliability comprises analyzing predicted communication channel reliability.

33. The method of claim 32, where the communication channel reliability is based upon at least one of:
a reliability history of the communication channel, a reliability history of a current communication, a communication length, a communication type, a mean time between failure of the communication channel, an average failure duration of the communication channel, an average percent degradation of the communication channel, an atmospheric condition associated with the communication channel, a scheduled communication channel maintenance and a scheduled communication channel downtime.

34. The method of claim 31, where the communicating party preferences comprise at least one of: a contactor preference data and a contactee preference data.

35. The method of claim 34, where the communicating party context comprises at least one of: a contactor context data and a contactee context data.

36. The method of claim 35, where determining the expected utility comprises:
analyzing the contactor preference data, the contactor context data, the contactee preference data and/or the contactee context data to determine one or more relationships;
selecting one or more rules based, at least in part, on the relationships;
applying the one or more rules to determine a conditional expected utility;
determining an expected reliability of the communication channel based on at least one of the communication channel data and the relationships; and
updating the conditional expected utility based on the expected reliability of the communication channel.

37. The method of claim 35, where determining the expected utility comprises:
analyzing the communication channel reliability, the contactor preference data, the contactor context data, the contactee preference data and the contactee context data to determine one or more relationships;
selecting one or more rules based, at least in part, on the relationships;
determining an expected reliability of the communication channel based on at least one of: the communication channel data and the relationships; and
applying the one or more rules to determine an expected utility.

38. The method of claim 31, the communicating party preferences comprising:
deterministic data associated with known preferences; and
prediction data associated with unknown preferences.

39. The method of claim 31, the communicating party context comprising:
deterministic data associated with known context; and
prediction data associated with unknown context.

40. The method of claim 31, where determining an expected utility comprises:

analyzing the communication channel reliability, the communicating party preferences and the communicating party context to identify available data values;
analyzing the communication channel reliability, the communicating party preferences and the communicating party context to identify one or more missing data values;
inferring a value for the one or more missing data values; and
determining an expected reliability of the communication channel based on the available and inferred data values.

41. The method of claim 40, where the value for the one or more missing data values is inferred by decision-theoretic formulae.

42. A method for identifying an optimal communication between one or more communicating parties, comprising:
determining one or more current expected utilities associated with the communication based, at least in part, on a current communication channel data, on a current contactor data, and a current contactee data, where the current communication channel data comprises a reliability data, where the reliability data comprises deterministic data associated with the current communication channel and inference data associated with the current communication channel, where the current contactee data comprises a current state data and where the current contactor data comprises a current state data;
determining one or more predicted expected utilities associated with the communication based, at least in part, on a predicted communication channel data, a predicted contactor data and a predicted contactee data, where the predicted communication channel data comprises a predicted reliability data, where the predicted contactee data comprises a predicted state data and the predicted contactor data comprises a predicted state data;
comparing one or more current expected utilities to one or more predicted expected utilities; and
ranking the current expected utilities with the predicted expedited utilities, where the ranking of the predicted expected utilities is weighted by one or more costs associated with delaying the communication to a point in time associated with the predicted expected utility.

43. A system for optimizing one or more contacts between one or more parties, comprising:
means for determining one or more expected utilities associated with the contact based, at least in part, on data associated with one or more contactors, data associated with one or more contactees and data associated with one or more communication channels, where the data associated with the communication channels comprises at least reliability data, where the reliability data comprises deterministic data associated with the one or more communication channels and inference data associated with the one or more communication channels; and
means for identifying the contact.

44. The system of claim 43, comprising:
means for applying one or more inference formulae to infer probabilities associated with: one or more pieces of data associated with a contactor, one or more pieces of data associated with a contactee, and one or more pieces of data associated with a communication channel.

45. A computer readable medium storing computer executable components for a system that facilitates increasing the utility of a communication between entities, the system comprising:

an identifying computer component that identifies a plurality of communication channels that facilitate communication between at least two entities, and an analyzing component that analyzes a communication channel data set, a first communication data set associated with a first entity, and a second communication data set associated with a second entity, the analyzing component identifying a subset of the plurality of channels that will increase the utility of the communication based at least in part on analysis of the communication channel data set, the first communication data set and the second communication data set, where the communication channel data set comprises at least reliability data, where the reliability data in the communication channel data set comprises:

deterministic data associated with the communication channel;

inference data associated with the communication channel.

46. A computer readable medium containing computer executable instructions for performing a process for identifying one or more communication channels that will maximize the utility of one or more communications between one or more communicating parties, the process comprising:

identifying one or more candidate communication channels between the communicating parties; and determining one or more expected utilities associated with a communication between the communicating parties based, at least in part, on contactor data, contactee data and communication channel data, where the communication channel data comprises at least reliability data, where the reliability data in the communication channel data comprises:

deterministic data associated with the one or more candidate communication channels;

inference data associated with the one or more candidate communication channels.

* * * * *